(12) United States Patent
Kogure et al.

(10) Patent No.: US 10,746,368 B2
(45) Date of Patent: Aug. 18, 2020

(54) VEHICULAR HEADLIGHT

(71) Applicant: STANLEY ELECTRIC CO., LTD., Meguro-ku, Tokyo (JP)

(72) Inventors: Shinya Kogure, Tokyo (JP); Ryotaro Owada, Tokyo (JP); Toshihiro Seko, Tokyo (JP); Takashi Sugiyama, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/616,408

(22) PCT Filed: May 16, 2018

(86) PCT No.: PCT/JP2018/018979
§ 371 (c)(1),
(2) Date: Nov. 22, 2019

(87) PCT Pub. No.: WO2018/216576
PCT Pub. Date: Nov. 29, 2018

(65) Prior Publication Data
US 2020/0088374 A1    Mar. 19, 2020

(30) Foreign Application Priority Data

May 23, 2017  (JP) ................. 2017-101369
Jul. 11, 2017  (JP) ................. 2017-135322

(51) Int. Cl.
*B60Q 1/00*     (2006.01)
*F21S 41/25*    (2018.01)
(Continued)

(52) U.S. Cl.
CPC ............ *F21S 41/25* (2018.01); *F21S 41/16* (2018.01); *F21S 41/24* (2018.01); *F21V 9/30* (2018.02)

(58) Field of Classification Search
CPC .. F21S 41/25; F21S 41/24; F21S 41/16; F21S 41/255; F21S 41/285; F21S 41/176;
(Continued)

(56) References Cited

U.S. PATENT DOCUMENTS 7,654,712 B2    2/2010  Takeda et al.
8,686,644 B2 *  4/2014  Wootton ................. F21V 29/60
                                              315/117
(Continued)

FOREIGN PATENT DOCUMENTS

JP    H07108873 A    4/1995
JP    2008010228 A   1/2008
(Continued)

OTHER PUBLICATIONS

International Search Report (ISR) dated Jul. 17, 2018 (and English translation thereof), issued in International Application No. PCT/JP2018/018979.
(Continued)

*Primary Examiner* — Ali Alavi
(74) *Attorney, Agent, or Firm* — Holtz, Holtz & Volek PC

(57) ABSTRACT

Provided is a vehicular headlight that is capable of generating a clear light distribution pattern using a monolithic array light source of surface emitting lasers. The vehicular headlight 1a includes a VCSEL array 5, an image generation unit including a lens array 6 which outputs incident light from the VCSEL array 5 as collimated light so that an image of a light distribution pattern as an illuminance distribution is generated on an output side, a light distribution pattern forming unit 7 having an image forming surface on which the image is formed by the incident light from the image generation unit, and a projection unit 8 outputting the incident light from the light distribution pattern forming unit to an irradiation region in front of the vehicle.

15 Claims, 23 Drawing Sheets

(51) Int. Cl.
*F21S 41/24* (2018.01)
*F21S 41/16* (2018.01)
*F21V 9/30* (2018.01)

(58) Field of Classification Search
CPC .. F21S 41/265; F21S 41/663; B60Q 2300/42; B60Q 1/143; F21V 9/30; H01S 5/022
USPC ........................................................ 362/538
See application file for complete search history.

(56) References Cited

U.S. PATENT DOCUMENTS

| | | | |
|---|---|---|---|
| 10,352,546 | B2 | 7/2019 | Mochizuki et al. |
| 2008/0013329 | A1 | 1/2008 | Takeda et al. |
| 2013/0314672 | A1* | 11/2013 | Ogura ................ G03B 21/2033 353/31 |
| 2015/0233546 | A1 | 8/2015 | Park et al. |
| 2016/0073000 | A1* | 3/2016 | Abele ................ H04N 9/3182 348/148 |
| 2016/0373704 | A1* | 12/2016 | Akiyama ............. H04N 9/3152 |
| 2017/0125971 | A1* | 5/2017 | Hiraga ................. H04N 13/337 |
| 2018/0266669 | A1 | 9/2018 | Mochizuki et al. |
| 2019/0379178 | A1* | 12/2019 | Muramatsu ........... H01S 5/4093 |

FOREIGN PATENT DOCUMENTS

| | | |
|---|---|---|
| JP | 2012162121 A | 8/2012 |
| JP | 2013073692 A | 4/2013 |
| JP | 2016149273 A | 8/2016 |
| JP | 2016215788 A | 12/2016 |
| WO | 2016072484 A1 | 5/2016 |

OTHER PUBLICATIONS

Written Opinion of the International Searching Authority dated Jul. 17, 2018 issued in International Application No. PCT/JP2018/018979.

* cited by examiner

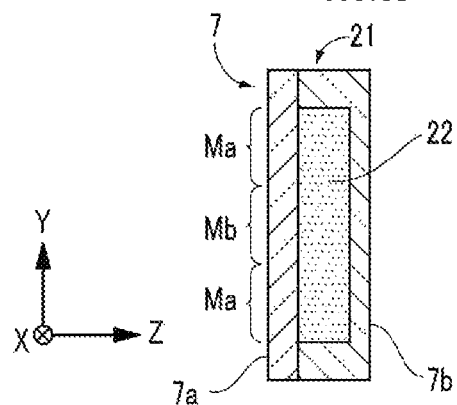
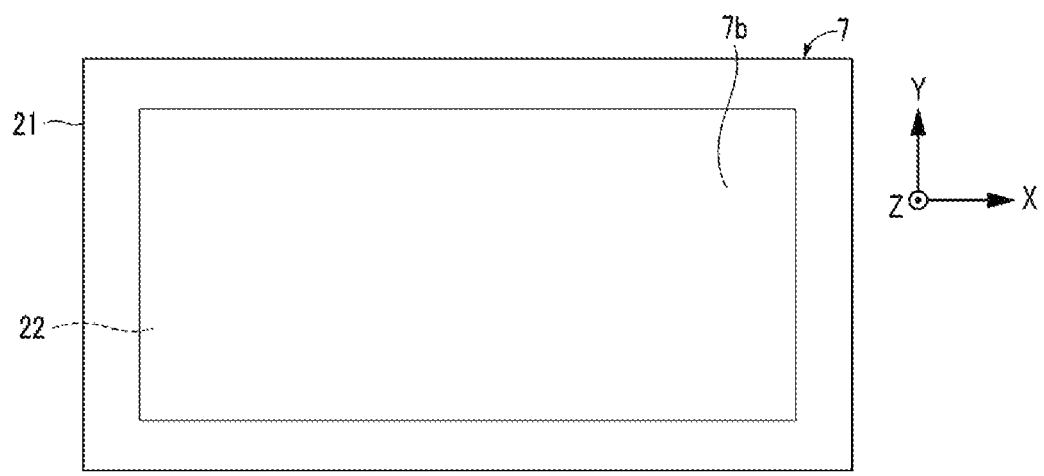

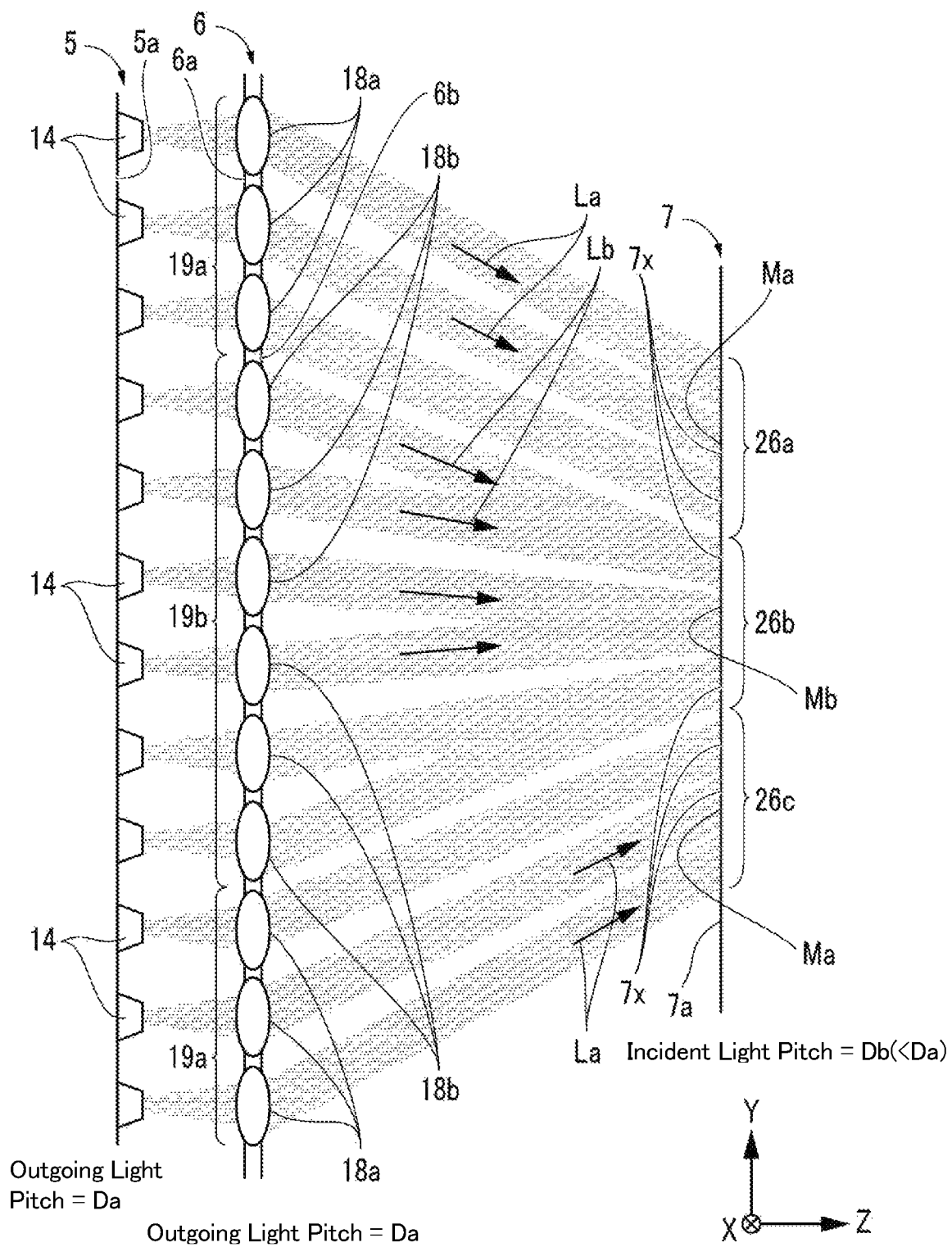

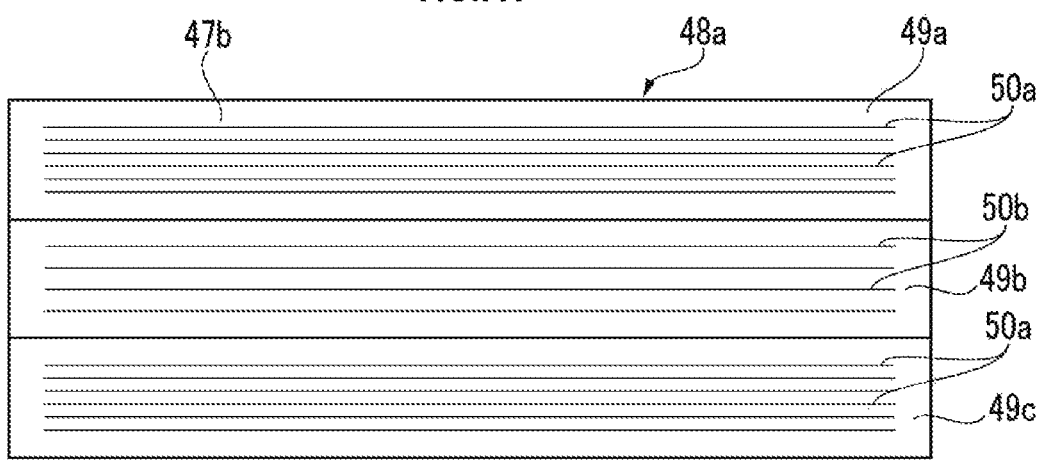
FIG.7A
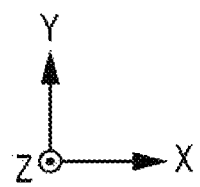

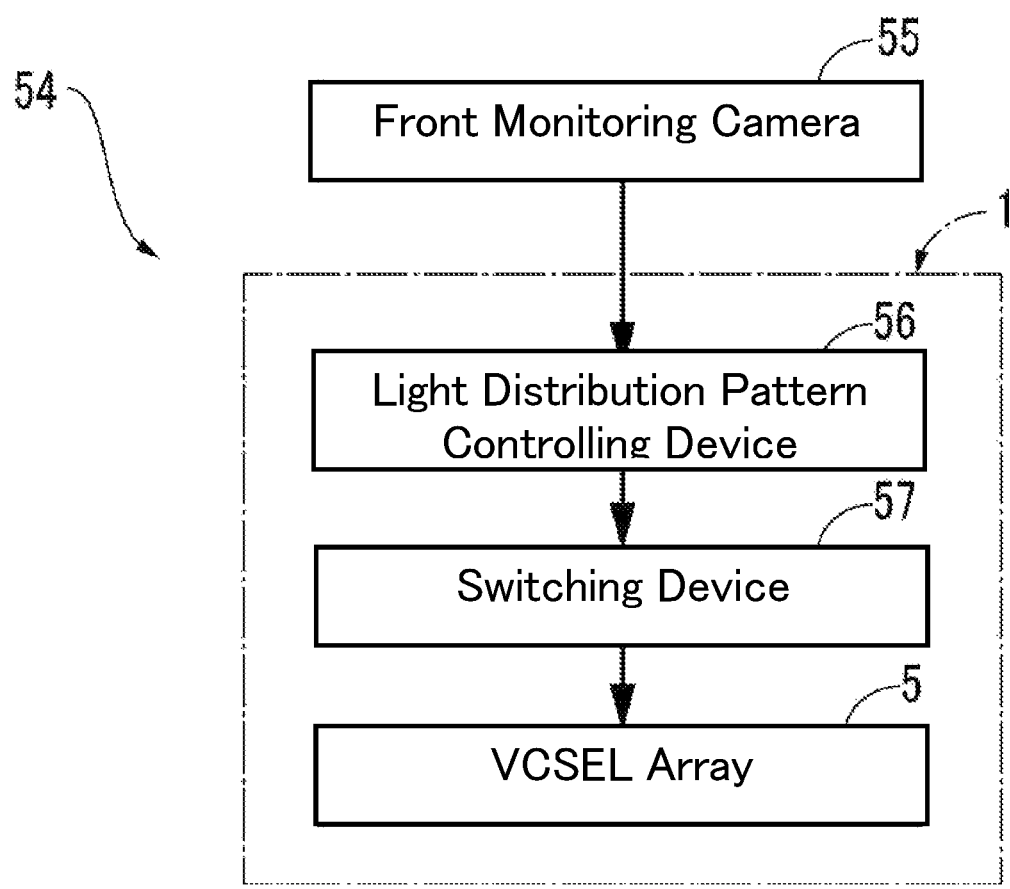

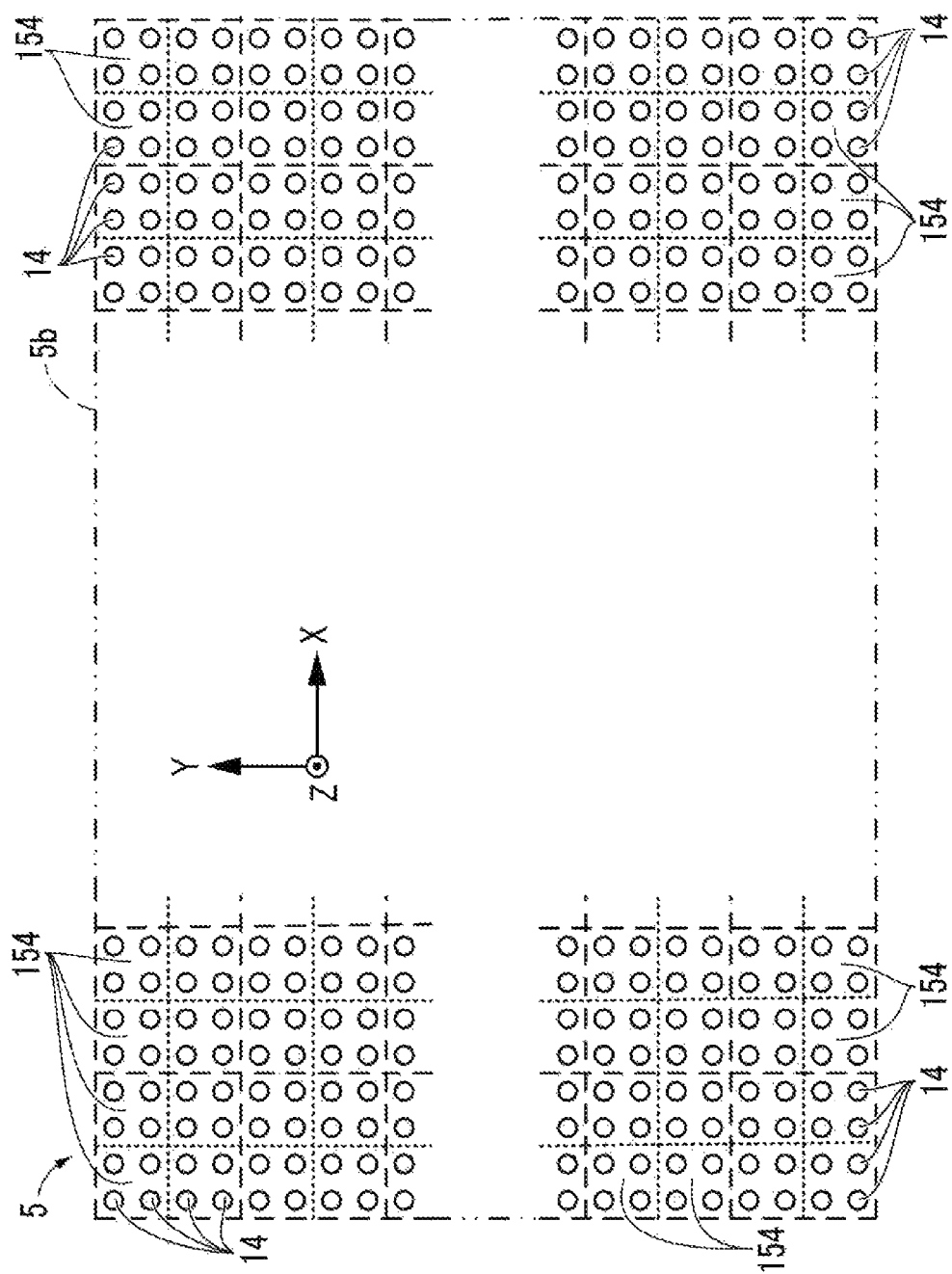

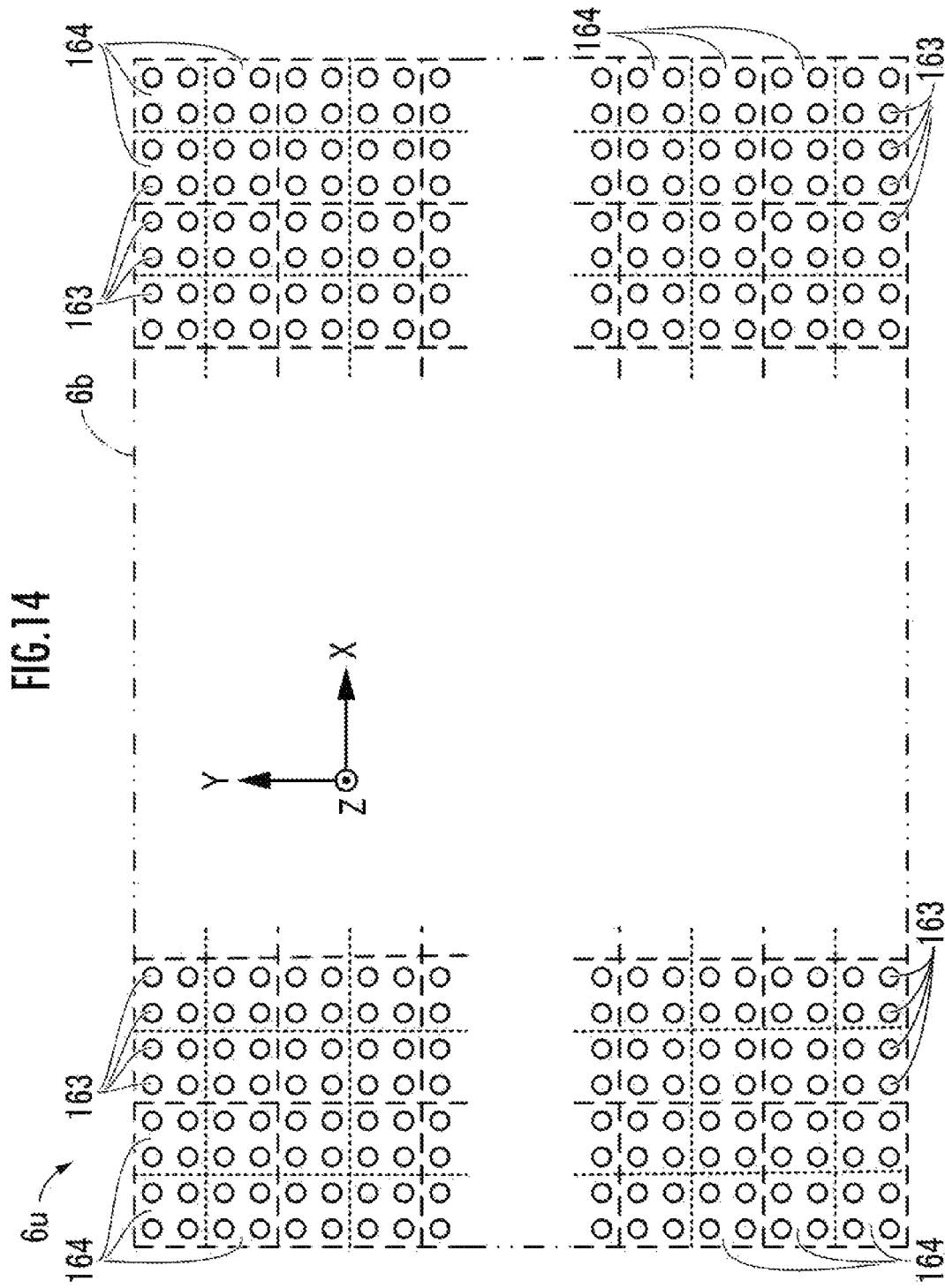

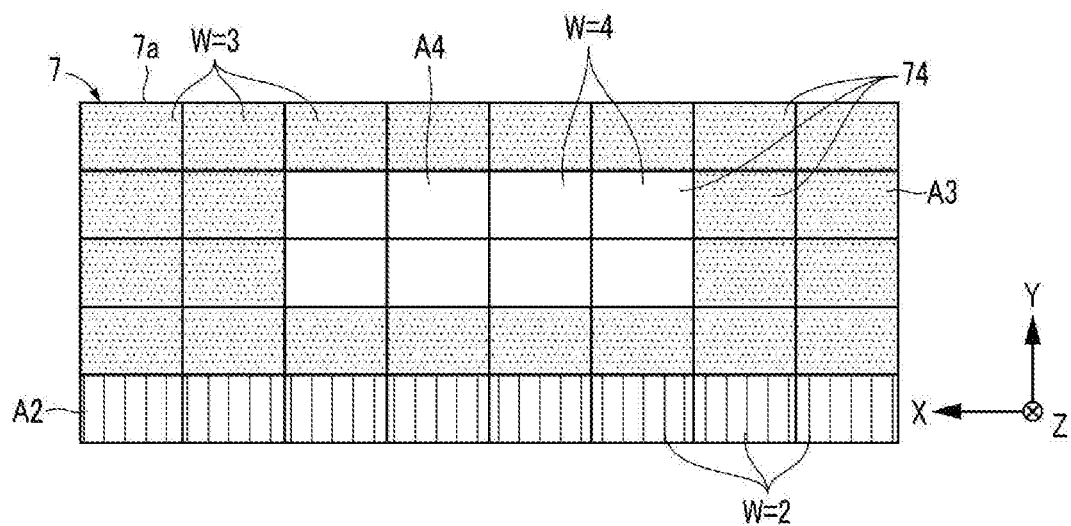
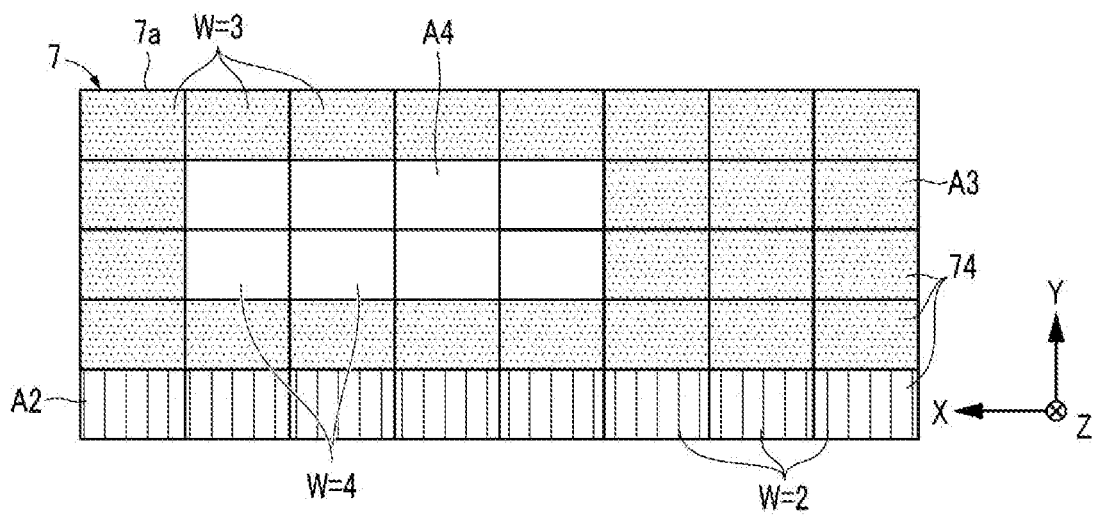

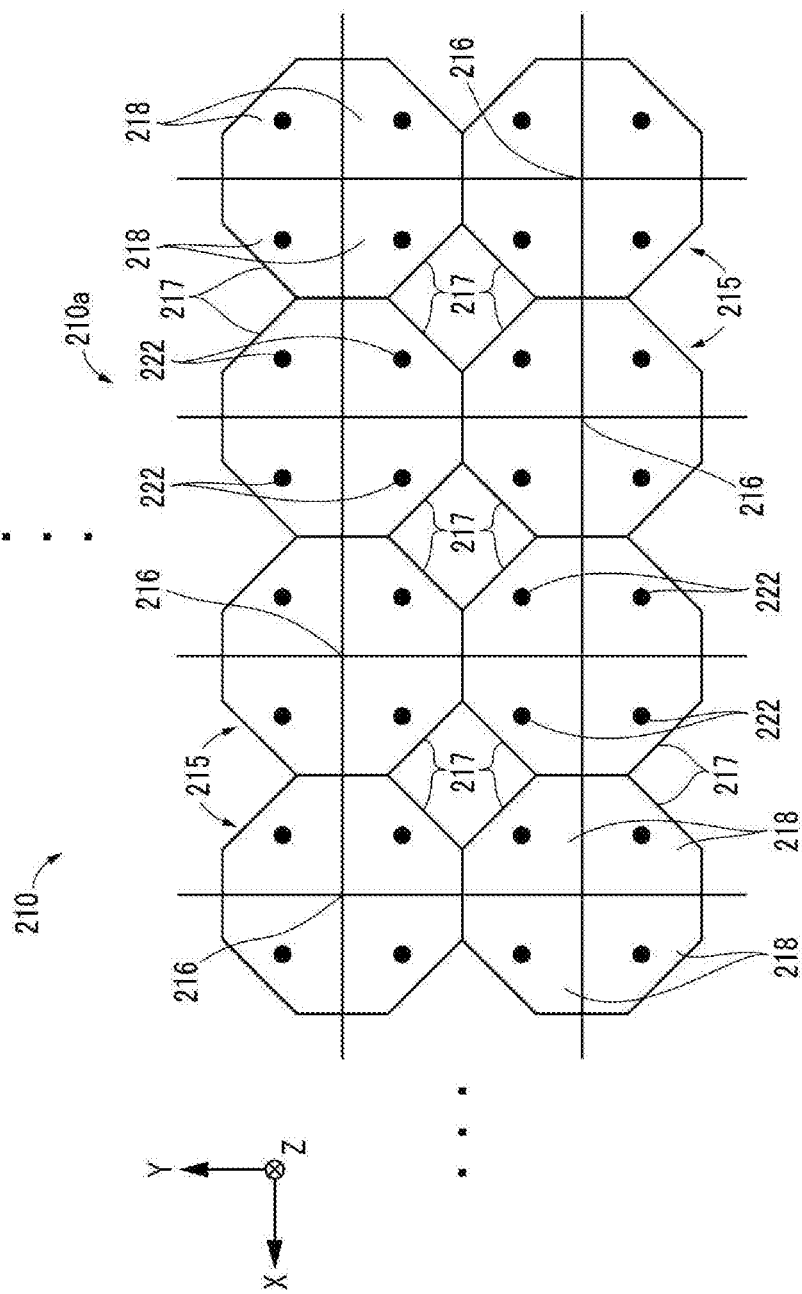

10,746,368 B2

VEHICULAR HEADLIGHT

TECHNICAL FIELD

The present invention relates to a vehicular headlight using a monolithic array light source in which a plurality of surface emitting lasers (VCSEL (Vertical Cavity Surface Emitting Laser): Vertical Cavity Surface Emitting LASER) are arranged.

BACKGROUND ART

A vehicular headlight using a monolithic array light source in which a plurality of surface emitting lasers are arranged has been known (example: Patent Literature 1).

According to the vehicular lamp of Patent Literature 1, a mask is superimposed on a monolithic array light source, and the mask is provided with an opening portion containing a phosphor at a position of each surface emitting laser of the monolithic array light source. Laser light of each surface emitting laser of the monolithic array light source is incident on the opening portion of the mask, and a part of the light is converted in wavelength by the phosphor in the opening portion to be emitted from the opening portion.

In the vehicular lamp of Patent Literature 1, in addition to the foregoing feature, the diameter of the opening portion increases toward the emission side. As a result, the laser light of the surface emitting laser spreads in the radial direction and is emitted from the opening portion, so that the dark portions caused by separation portions between the surface emitting lasers of the monolithic array light source are eliminated.

Patent Literature 2 discloses a light distribution controlling device for a vehicular headlight using a bulb type light source (lamp). The light distribution controlling device detects the presence and position of an oncoming vehicle and a preceding vehicle from the captured image by its own camera, and changes the direction of the bulb type light source in the vehicle width direction by an actuator so as not to irradiate the forward vehicle such as an oncoming vehicle with light while maintaining the vehicular headlight at a high beam.

Patent Literatures 3 to 6 disclose vehicular headlights that perform AFS (Adaptive Front-lighting System) and ADB (Adaptive Driving Beam) while adopting a semiconductor light emitting device, such as a laser or an LED (Light Emitting Diode), as a part or all of the light sources. In these vehicular headlights, when the range of the irradiation region is to be changed or the illuminance in a predetermined region portion within the irradiation region is altered, the orientation of the housing accommodating the light sources is moved up, down, left, and right by the actuator.

CITATION LIST

Patent Literature

Patent Literature 1: Japanese Patent Application Laid-Open No. 2008-10228
Patent Literature 1: Japanese Patent Application Laid-Open No. Hei. 7-108873
Patent Literature 3: Japanese Patent Application Laid-Open No. 2012-162121
Patent Literature 4: Japanese Patent Application Laid-Open No. 2013-73692
Patent Literature 5: Japanese Patent Application Laid-Open No. 2016-149273
Patent Literature 6: Japanese Patent Application Laid-Open No. 2016-215788

SUMMARY OF INVENTION

Technical Problem

As one property of the laser light, light may not diverge. This property of the laser light of the surface emitting laser is highly useful when the light distribution pattern of a vehicular headlight should be controlled. On the other hand, the phosphor has a property of diverging light.

In the vehicular headlight of Patent Literature 1, light immediately after being emitted from the surface emitting laser is wavelength-converted by the phosphor before being emitted. That is, since the emission light diverges, the boundary between the irradiated portion and the non-irradiated portion is blurred, so that it is difficult to generate a clear light distribution pattern. In the vehicular headlight disclosed in Patent Literature 1, the diameter of the opening portion of the mask increases toward the emission side. The light reflected on the peripheral wall of the opening portion, however, is emitted in a direction completely different from the traveling direction of the light traveling through the center of the opening portion. This means that the divergence of the outgoing light from the opening portion is increased, which further hinders the generation of a clear light distribution pattern.

Although the vehicular headlight of Patent Literature 1 uses a VCSEL(s), the respective irradiation points of the irradiation region are each irradiated with light from only one corresponding VCSEL. Thus, the brightest illuminance in the irradiation region is defined by the illuminance by the emission light from the associated one VCSEL and cannot be increased.

Patent Literature 2 discloses a light distribution controlling device for a vehicular headlight, but is not related to a technique for the suppression of the divergence of emission light from a monolithic array light source.

The vehicular headlights in Patent Literatures 3 to 5 relate to a system in which the orientation of a housing accommodating a light source is changed by an actuator in order to alter the illuminance of a range of an irradiation region or a specific region part within the irradiation region. That is, the irradiation region is moved as a whole, and the light distribution pattern of the irradiation region itself is not changed.

It is an object of the present invention to provide a vehicular headlight that is capable of generating a clear light distribution pattern using a monolithic array light source of surface emitting lasers.

Solution to Problem

A vehicular headlight according to the present invention is characterized by including:
a monolithic array light source in which a plurality of surface emitting lasers are arranged;
an image generation unit configured to include a lens array in which a plurality of collimator lenses are arranged for outputting incident lights from the respective surface emitting lasers of the monolithic array light source as collimated lights, and to output incident lights from the respective surface emitting lasers of the monolithic array light source by adjusting directions of lights after passing so that an image of a light distribution pattern as an illuminance distribution is generated on an output side;

a light distribution pattern forming unit configured to include an image forming surface on which the image of the light distribution pattern is formed by the incident lights from the image generation unit, and to emit the incident lights from the image generation unit through the image forming surface;

a projection unit configured to output the incident lights from the light distribution pattern forming unit to an irradiation region in front of the vehicle; and a light source controlling unit configured to control luminance of the monolithic array light source.

According to the present invention, the combination of the monolithic array light source of the surface emitting lasers and the lens array of the lens array of the image generating unit enables the image of the image forming surface of the light distribution pattern forming unit to be clarified. This allows the use of a monolithic array light source of surface emitting lasers to generate a clear light distribution pattern.

In the present invention, it is preferable that the lens array include:

a first group of collimator lenses configured to change the directions of the incident lights and output the lights so that light incident points of the incident lights from the plurality of surface emitting lasers of the monolithic array light source do not overlap with each other on the image forming surface of the light distribution pattern forming unit, and a second group of collimator lenses configured to change the directions of the incident lights and output the lights so that light incident points of the incident lights from the plurality of surface emitting lasers of the monolithic array light source overlap with each other on the image forming surface of the light distribution pattern forming unit.

According to this configuration, it is possible to smoothly form a light distribution pattern including regions of high illuminance and low illuminance depending on whether the light incident points of the laser lights of the plurality of surface emitting lasers of the monolithic array light source are overlapped with each other or not on the image forming surface of the light distribution pattern forming unit.

In the present invention, it is preferable that the image generating unit include a prism member configured to adjust the direction of the incident light from each collimator lens of the lens array after passing and output the light so that an image of the light distribution pattern as an illuminance distribution is generated on the output side.

According to this configuration, after the laser lights of the surface emitting lasers of the monolithic array light source have passed through the collimator lenses of the lens array, they pass through the prism member, so that the directions of the lights are adjusted by the prism member. Thus, a clear light distribution pattern is formed on the image forming surface, and a desired light distribution pattern can be smoothly generated.

In the present invention, it is preferable that the prism member include:

a first group of prisms configured to change the directions of the incident lights and output the lights so that light incident points of the incident lights from the plurality of collimator lenses of the lens array do not overlap with each other on the image forming surface of the light distribution pattern forming unit, and a second group of prisms configured to change the directions of the incident lights and output the lights so that light incident points of the incident lights from the plurality of collimator lenses of the lens array overlap with each other on the image forming surface of the light distribution pattern forming unit.

According to this configuration, it is possible to smoothly realize whether the light incident points of the incident lights from the plurality of surface emitting lasers of the monolithic array light source are not overlapped or are overlapped with each other in the image forming surface of the light distribution pattern forming unit by using the prism member.

In the present invention, it is preferable that the light source controlling unit include:

a switching device configured to individually switch turned-on and turned-off of the plurality of surface emitting lasers of the monolithic array light source for each pair or each set, and a light distribution pattern controlling device configured to control the switching device such that when presence of a vehicle is detected in the irradiation region of the vehicular headlight, the surface emitting laser(s) for generating emission light(s) directed to the vehicle is turned off.

According to this configuration, it is possible to generate a desired light distribution pattern according to the position of the forward vehicle by individually switching on and off the plurality of surface emitting lasers of the monolithic array light source for each pair or for each set.

In the present invention, it is preferable that at least a part of the plurality of collimator lenses of the lens array output a plurality of incident lights from the plurality of surface emitting lasers of the monolithic array light source toward a common light incident point on the image forming surface of the light distribution pattern forming unit.

According to this configuration, the use of the collimator lens(es) of the lens array can generate the light incident point with a higher illuminance than that at other light incident points on the image forming surface of the light distribution pattern forming unit.

In the present invention, it is preferable that the monolithic array light source be configured to have a plurality of groups such that each of the groups has a plurality of the surface emitting lasers in at least a part of the array of surface emitting lasers, the light distribution pattern forming unit have a light incident surface on which the plurality of light incident points are distributed in a constant density and a light distribution pattern is generated as a distribution of illuminance by the incident light to each of the light incident points, and a light outgoing surface through which lights having passed through the light incident surface are outputted, and the image generating unit change the direction of each emission light so that the emission lights of the surface emitting lasers belonging to the same group in the monolithic array light source are incident on a corresponding common light incident point on the light incident surface of the light distribution pattern forming unit.

According to this configuration, the generation of the light incident point with the high illuminance on the image forming surface of the light distribution pattern forming unit can be smoothly achieved by grouping the surface emitting lasers of the monolithic array light source such that the emission lights of the surface emitting lasers belonging to the same group in the monolithic array light source are incident on the common light incident point of the light incident surface of the light distribution pattern forming unit.

In the present invention, it is preferable that the collimator lenses of the lens array and the surface emitting lasers of the monolithic array light source be associated with each other in a one-to-one correspondence, and each of the collimator lenses direct the incident light from each of the surface emitting lasers to a corresponding one of the light incident points of the light distribution pattern forming unit.

According to this configuration, the respective emission lights from the plurality of surface emitting lasers belonging to the same group of the monolithic array light source can be made smoothly incident on the corresponding light incident point of the light incident surface of the light distribution pattern forming unit by the collimator lenses corresponding to the respective surface emitting lasers of the monolithic array light source in a one-to-one correspondence.

In the present invention, it is preferable that the image generating unit include a first optical unit as the lens array and a second optical unit different from the first optical unit, in the first optical unit, the collimator lenses be associated with the surface emitting lasers of the monolithic array light source in a one-to-one correspondence to output the incident lights from the respective surface emitting lasers as collimated lights in the same direction, and in the second optical unit, the incident lights from the respective collimator lenses of the first optical unit be directed to the corresponding light incident points of the light distribution pattern forming unit.

According to this configuration, the emission lights of the respective surface emitting lasers of the monolithic array light source are converted into collimated lights directed in the same direction by the respective collimator lenses of the first optical unit, and are then incident on the corresponding light incident points of the light distribution pattern forming unit through the second optical unit. As a result, the light directed from the second optical unit to the corresponding light incident point on the light incident surface of the light distribution pattern forming unit becomes homogeneous light whose spreading is suppressed. Thus, it is possible to generate a favorable illuminance distribution on the light incident surface of the light distribution pattern forming unit.

In the present invention, it is preferable that the light source controlling unit control the illuminance distribution on the light incident surface by controlling the number of the turned-on surface emitting lasers of each group of the monolithic array light source.

According to this configuration, the controlling of the number of the turned-on surface emitting lasers of each group of the monolithic array light source by the light source controlling unit can lead to smoothly control the illuminance at each of light incident points on the light incident surface of the light distribution pattern forming unit.

In the present invention, it is preferable that the light incident surface of the light distribution pattern forming unit be sectioned into a plurality of sections each including a single light incident point inside, and the light source controlling unit control an illuminance stage of the section of the light distribution pattern forming unit by changing the number of the turned-on surface emitting lasers of the group of the monolithic array light source corresponding to the section.

According to this configuration, the light incident surface of the light distribution pattern forming unit is sectioned into the plurality of sections each including one light incident point inside. The illuminance stage of each section of the light distribution pattern generating unit is controlled by changing the number of the turned-on surface emitting lasers of the group of the monolithic array light source corresponding to the section. In this manner, the controlling of the light incident surface of the light distribution pattern forming unit by the illuminance stage for each section can lead to generate the distribution pattern by the correct illuminance stage as the correct light distribution pattern on the light incident surface of the light distribution pattern forming unit.

In the present invention, it is preferable that the light source controlling unit control the number of the turned-on surface emitting lasers for each group of the monolithic array light source so that a region including a plurality of sections of the brightest illuminance stage on the light incident surface of the light distribution pattern forming unit moves in an optional direction with respect to the center of the light incident surface.

According to this configuration, the region including the plurality of sections of the brightest illuminance stage in the light incident surface of the light distribution pattern forming unit is moved in an optional direction with respect to the center of the light incident surface, so that the brightest region in the irradiation region can be smoothly changed.

In the present invention, it is preferable that the light source controlling unit control the number of the turned-on surface-emitting lasers for each group of the monolithic array light sources so that the illuminance stage of the plurality of sections occupying the central portion on the light incident surface of the light distribution pattern forming unit becomes a brighter illuminance stage than the illuminance stage of the plurality of sections occupying the peripheral portion thereof.

According to this configuration, the central portion of the irradiation region can be brightly illuminated.

In the present invention, it is preferable that the illuminance stage of the section include an illuminance stage in which the illuminance of the light incident point included in the section becomes 0 (zero).

According to this configuration, the controlling of the illuminance stage of the section to be 0 can lead to smoothly generate a portion which is not irradiated with light inside the irradiation region.

In the present invention, it is preferable that the light distribution pattern forming unit be a light scattering unit having translucency.

According to this configuration, the illuminance distribution which is the basis of the light distribution pattern can be appropriately generated in the light scattering unit having translucency.

In the present invention, it is preferable that the light distribution pattern forming unit be a wavelength conversion unit configured to perform wavelength conversion of the passing light by a phosphor.

According to this configuration, the illuminance distribution which is the basis of the light distribution pattern can be appropriately generated in the wavelength conversion unit.

BRIEF DESCRIPTION OF DRAWINGS

FIG. 3B is a cross-sectional view of the light distribution pattern forming unit 7 of FIG. 1 taken along a longitudinal direction.

FIG. 3C is a front view of the light distribution pattern forming unit of FIG. 1.

FIG. 4 is a diagram showing an optical path between the VCSEL array and the phosphor plate of FIG. 1.

FIG. 7A is a front view of a prism member in FIG. 5.

FIG. 8 is a block diagram of an ADB device.

FIG. 13 is a diagram showing the arrangement state of VCSEL on the light emitting surface of the monolithic array light source of FIG. 11.

FIG. 14 is a diagram showing an arrangement state of collimator lenses on a light outgoing surface of the lens array of FIG. 11.

FIG. 18A is a diagram showing an illuminance distribution pattern when the vehicle is traveling straight.

FIG. 18B is an illuminance distribution pattern diagram at the time of turning to the left.

FIG. 21 is a structural diagram of a prism device by which the lens array of FIG. 20 is replaced.

DESCRIPTION OF EMBODIMENTS

First Embodiment

Figure 1:
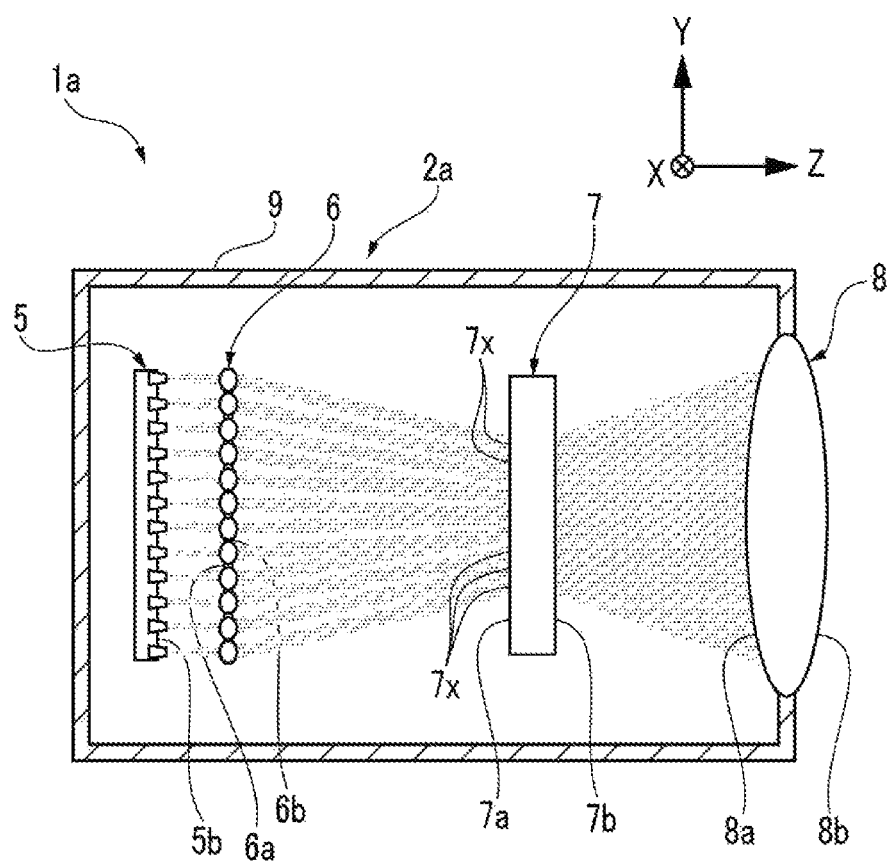
FIG. 1 is a schematic diagram showing the inside of an illumination unit of a vehicular headlight according to a first embodiment.

FIG. 1 is a schematic diagram of an illumination unit 2a of a vehicular headlight 1a. The vehicular headlight 1a includes the illumination unit 2a and a light source controlling unit (for example, a light distribution pattern controlling device 56 and a switching device 57 shown in FIG. 8). The illumination unit 2a includes a VCSEL (Vertical Cavity Surface Emitting LASER) array 5, a lens array 6, a light distribution pattern forming unit 7, and a projection unit 8, which are provided in this order in a housing 9. A vehicle (for example, an own vehicle 67 in FIG. 9) is equipped with the vehicular headlight 1a on each of the left and right sides at the front portion of the vehicle body thereof.

The traveling directions of the lights (luminous fluxes) indicated by the arrows in FIG. 1 are schematically shown in the same manner as in the configuration of the illumination unit 2a. Accurate traveling directions will be described later with reference to FIG. 4.

For convenience of description of the configuration, a three-axis orthogonal coordinate system will be defined. In the illumination unit 2a, when the light-emitting-side surface is defined as the front surface, the X-axis is horizontally oriented in the left-right direction and the Y-axis is vertically oriented as viewed in the front view. The Z-axis is defined as the front and rear directions of the illumination unit 2a. In the X-axis, the right side in the horizontal direction is set to a positive direction. In the Y-axis, the upper side is set to a positive direction. In the Z-axis, the front side of the illumination unit 2a is set to a positive direction.

The illumination unit 2a is mounted on each of the left and right sides at the front portion of the vehicle body (not illustrated). The projection unit 8 is, for example, a projection lens, and is mounted on the front end of the housing 9 so as to be exposed to the front portion of the vehicle body.

A light emitting surface 5b of the VCSEL array 5 and a light incident surface 6a of the lens array 6 face each other directly. A light outgoing surface 6b of the lens array 6 and a light incident surface 7a of the light distribution pattern forming unit 7 face each other directly. A light outgoing surface 7b of the light distribution pattern forming unit 7 and a light incident surface 8a of the projection unit 8 face each other directly. The illumination light of the vehicular headlight 1a is outputted from a light outgoing surface 8b of the projection unit 8 toward the irradiation region in front of the vehicle.

Figure 2A:
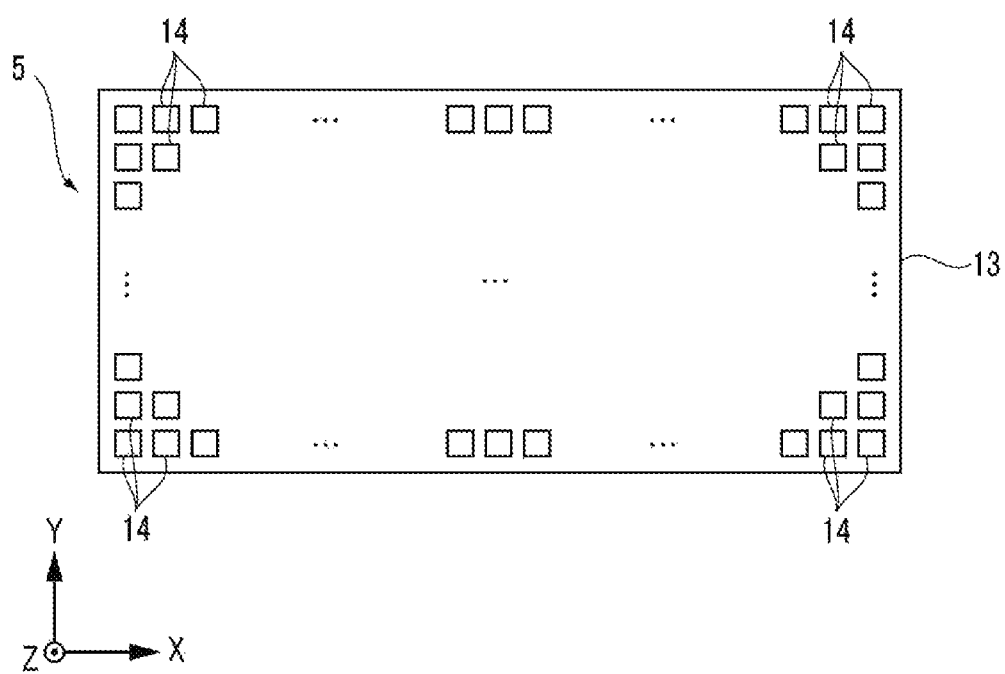
FIG. 2A is a front view of a VCSEL array in FIG. 1.

FIG. 2A is a front view of the VCSEL array 5 in the housing 9. For convenience of description, the surface on the light emitting side of each element arranged on the optical path in the housing 9 will be referred to as a front surface, and the surface on the incident side will be referred to as a back surface. In the VCSEL array 5, a plurality of VCSELs 14 as surface emitting lasers are formed in a two-dimensional array on a common sapphire substrate 13. The VCSEL array 5 having the plurality of VCSELs 14 is distinguished from a hybrid array light source in which a plurality of semiconductor lasers are assembled on a common insulating substrate, and from a monolithic array light source in which edge emitting lasers (an edge emitting laser is distinguished from a VCSEL as a surface emitting laser) are formed in a two-dimensional array.

As examples of dimensions and shapes, the VCSELs 14 each have a square shape having a length and a width of 70 μm, and a separation portion having a length and a width of 30 μm is formed between longitudinally or transversely adjacent VCSELs 14. The VCSELs 14 are formed on the sapphire substrate 13 and longitudinally and transversely arranged at equal intervals in an array of 50×200 pieces in total.

Figure 2B:
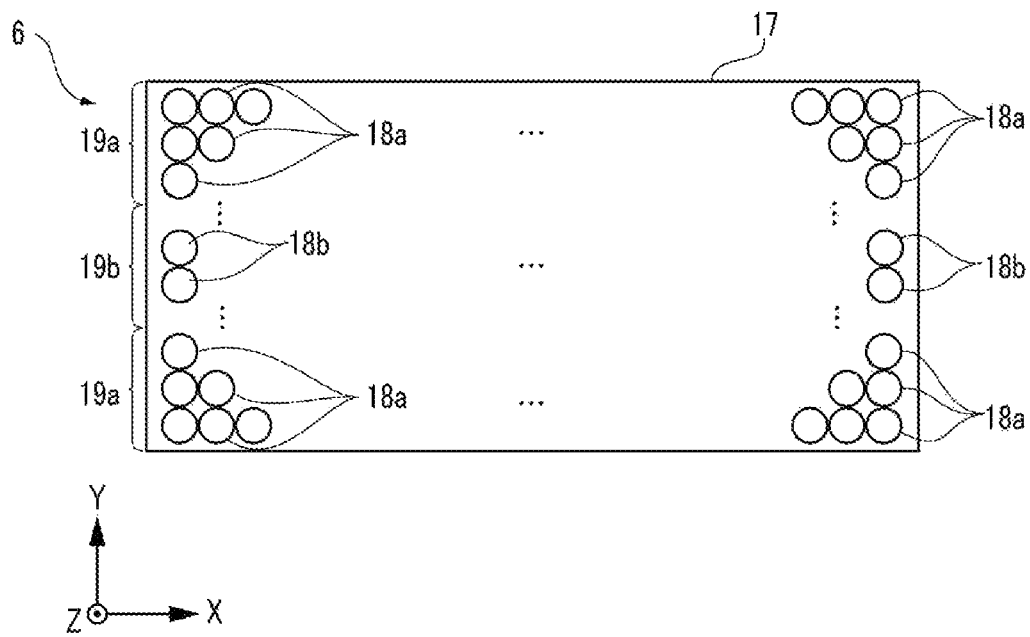
FIG. 2B is a front view of a lens array in FIG. 1.

FIG. 2B is a front view of the lens array 6 in the housing 9. The lens array 6 includes, as an image generation unit, collimator lenses 18a of a first group 19a and collimator lenses 18b of a second group 19b on a common transparent planar substrate 17. In FIG. 2B, the longitudinal and transversal directions of the lens array 6 correspond to the vertical direction and the vehicle width direction of the vehicle in which the vehicular headlight 1a is mounted. The lens array 6 is divided into three sections in the longitudinal direction. The collimator lenses 18a of the first group 19a are formed in the upper and lower sections, and the collimator lenses 18b of the second group 19b are formed in the middle section.

Since the action of the collimator lenses 18a and 18b will be described later in detail with reference to FIG. 4, the collimator lenses 18a and 18b will be schematically described in FIG. 2B. The collimator lenses 18a and 18b are formed in a circular shape with an equal diameter, and adjoining ones in the longitudinal and transversal directions are in contact with each other on common tangent lines.

The arrangement pattern of the collimator lenses 18a and 18b in the lens array 6 is matched with the arrangement pattern of the VCSELs 14 in the VCSEL array 5. The light emitting surface 5b of the VCSEL array 5 and the light incident surface 6a of the lens array 6 face each other directly while being in parallel with each other. The collimator lenses 18a and 18b output, as collimated lights, slightly spread laser lights that have emitted from the respective VCSELs 14 of the VCSEL array 5 and entered the lenses 18a and 18b.

Figure 3A:
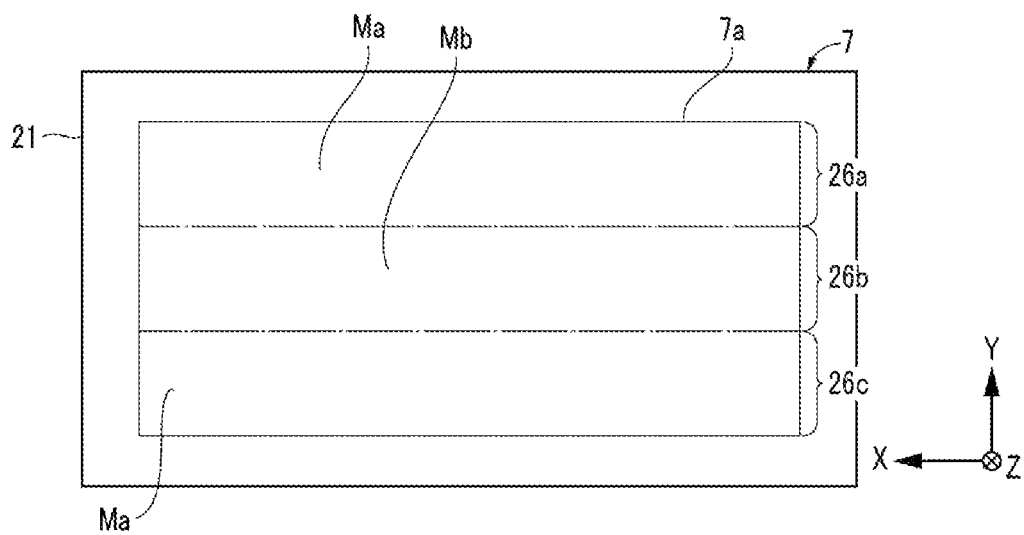
FIG. 3A is a rear view of a light distribution pattern forming unit in FIG. 1.

FIG. 3A is a rear view of the light distribution pattern forming unit 7, FIG. 3B is a cross-sectional view of the light distribution pattern forming unit 7 cut along the longitudinal direction, and FIG. 3C is a front view of the light distribution pattern forming unit 7. In this example, the light distribution pattern forming unit 7 is a phosphor plate, and includes a container body 21 in the shape of a rectangular plate, and phosphor particles 22 filled in a housing space extending in the shape of a rectangular plate with a predetermined thickness inside the container body 21.

The outgoing light of the lens array 6 enters the light incident surface 7a, which serves as an image forming surface, passes through the phosphor particles 22, and exits from the light outgoing surface 7b toward the projection unit 8. The emission color of the VCSELs 14 of the VCSEL array 5 is blue, and the light emitted from the VCSELs 14 reaches the light incidence surface 7a of the light distribution pattern forming unit 7 while maintaining the blue color.

Then, the light passes through the housing space of the phosphor particles 22 in the container body 21, during which a part of the light is wavelength-converted into yellow light having a longer wavelength by the phosphor particles 22. Thus, the outgoing light from the light emitting surface 7b becomes white, which is required as the illumination light color of the vehicular headlight 1a, by mixing the blue light and the yellow light, and is directed to the projection unit 8.

The outgoing light from the lens array 6 forms an image of a light distribution pattern as a desired illuminance distribution on the light incidence surface 7a of the light distribution pattern forming unit 7. In the illumination unit 2a, the illuminance distribution formed on the light incident surface 7a is sectioned into three sections in the longitudinal direction, including an upper section 26a, a middle section 26b, and a lower section 26c. The upper section 26a and the lower section 26c out of the three sections constitute low illuminance portions Ma, and the middle section 26b constitutes a high illuminance portion Mb. The reason why the low illuminance portions Ma and the high illuminance portion Mb are generated will be described in detail with reference to FIG. 4.

The low illuminance portions Ma are generated by incident lights from the collimator lenses 18a of the first groups 19a, and the high illuminance portion Mb is generated by incident lights from the collimator lenses 18b of the second group 19b. The high illuminance portion Mb corresponds to a region at which a driver must gaze the most when driving the vehicle in the irradiation region of the vehicular headlight 1a.

FIG. 4 is a diagram showing an optical path between the VCSEL array and the phosphor plate. For convenience of description, "columns" and "rows" are defined. With respect to the VCSELs 14 in the VCSEL array 5, the collimator lenses 18a and 18b in the lens array 6, and the collimator lenses 18c in the lens array 46 (FIG. 5), the longitudinal alignment is referred to as a "column" and the transversal alignment is referred to as a "row."

Figure 7B:
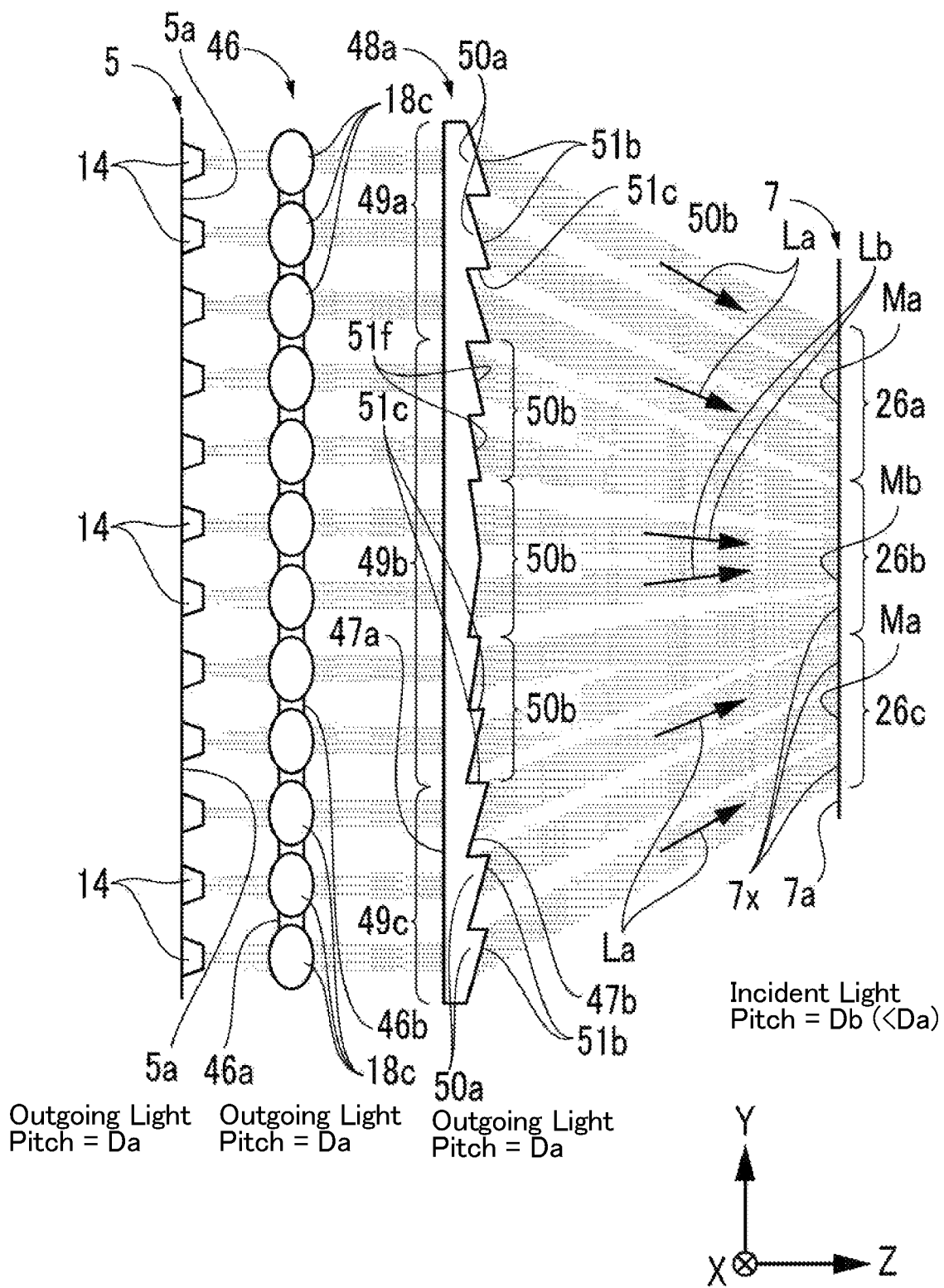
FIG. 7B is an optical path diagram when the vehicular headlight includes a prism member as a first example.
Figure 7C:
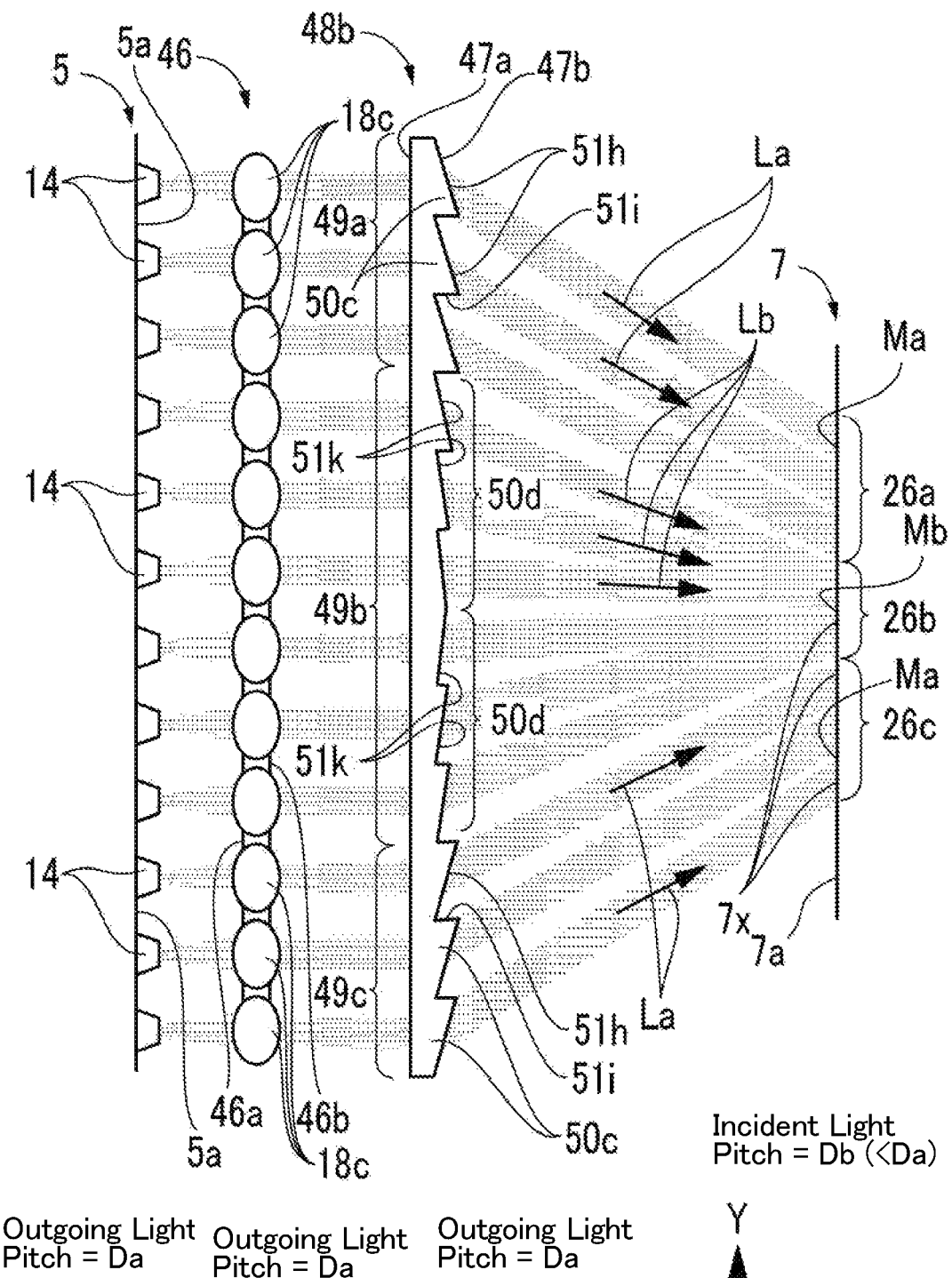
FIG. 7C is an optical path diagram when the vehicular headlight includes a prism member as a second example.

FIG. 4 and FIGS. 7B and 7C to be described later mainly describe the formation of images of light distribution patterns in the embodiment of the present invention. Thus, the number of columns of the VCSELs 14, collimator lenses 18a, 18b, and 18c or prisms 50a to 50d as illustrated in FIGS. 4, 7B and 7C is greatly reduced relative to the number of columns of actual products for simplicity of illustration.

The number of columns and the number of rows in the lens arrays 6 and 46 are equal to the number of columns and the number of rows in the VCSEL array 5, and are, for example, 50 and 200, respectively. The lengths of the column interval and the row interval in the lens arrays 6 and 46 are equal to the lengths of the column interval and the row interval in the VCSEL array 5. Hereinafter, the column intervals in the VCSEL array 5, the lens arrays 6 and 46, and the prism members 48a and 48b will be referred to as pitches.

In the embodiment, as shown in FIG. 1, the VCSEL array 5, the lens array 6, the light distribution pattern forming unit 7, and the projection unit 8 are disposed in the housing 9 with their center axes aligned. In FIG. 4, FIG. 7B and FIG. 7C, the length of the pitch of the VCSEL array 5 and the lens arrays 6 and 46 is set to Da, and as a result, the pitch of the outgoing lights becomes Da in the VCSEL array 5 and the lens arrays 6 and 46.

Db in FIG. 4 and FIG. 7B, and Dc in FIG. 7C, indicate the length of the pitches as the intervals in the longitudinal direction of the light incident points (spots) 7x on the light incident surface 7a of the light distribution pattern forming unit 7. As will be described later, Db's or Dc's are set equal to each other regardless of their longitudinal positions. In addition, the relationship of Db, Dc<Da is satisfied.

The two collimator lenses 18b adjacent to each other in the longitudinal direction in the second group 19b (hereinafter, referred to as "a pair of collimator lenses 18b in the longitudinal direction") adjust the direction, after passing, of incident lights which have been emitted from two corresponding VCSELs 14 of the VCSEL array 5 and have been incident thereon parallel to the center axis while slightly spreading in the radial direction such that the outgoing lights are close to each other, so that the incident lights are outputted as outgoing lights Lb (collimated lights) having a predetermined inclination angle with respect to the center axis. As a result, the outgoing lights Lb from the pair of collimator lenses 18b in the longitudinal direction in the second group 19b overlap with each other in the longitudinal direction in the middle section 26b on the light incident surface 7a of the light distribution pattern forming unit 7, so that they are incident on the common position (same position) in the longitudinal direction.

On the other hand, the outgoing lights La (collimated lights) of the respective collimator lenses 18a of the first group 19a are changed to be directed in a direction inclined with respect to the optical axis, but are incident at different respective positions in the longitudinal direction without overlapping with each other in the longitudinal direction in the upper section 26a or the lower section 26c of the light incident surface 7a of the light distribution pattern forming unit 7 while maintaining the order thereof in the longitudinal direction.

The pitches of the light incident points 7x of the outgoing lights La and Lb on the light incident surface 7a in the longitudinal direction are equal to Db regardless of the sections of the upper section 26a, the middle section 26b, and the lower section 26c. That is, the shape and orientation of each collimator lens of the collimator lenses 18a of the first group 19a and the collimator lenses 18b of the second group 19b are set in the lens array 6 so that the pitches are equal to Db.

The incident lights at the respective light incident points 7x in the middle section 26b are derived from the superposition of two emission lights Lb from the two VCSELs 14 having passed through the pair of collimator lenses 18b. On the other hand, the incident light at each light incident point 7x of each of the upper section 26a and the lower section 26c is the incident light La from one VCSEL 14 through only one collimator lens 18a. The pitch of the light incident points 7x on the light incident surface 7a are made equal to Db regardless of the position in the longitudinal direction. Accordingly, the high illuminance portion Mb is generated in the middle section 26b while the low illuminance portions Ma is generated in each of the upper section 26a and the lower section 26c. The illuminance of the high illuminance portion Mb is twice the illuminance of the low illuminance portion Ma.

Second Embodiment

Figure 5:
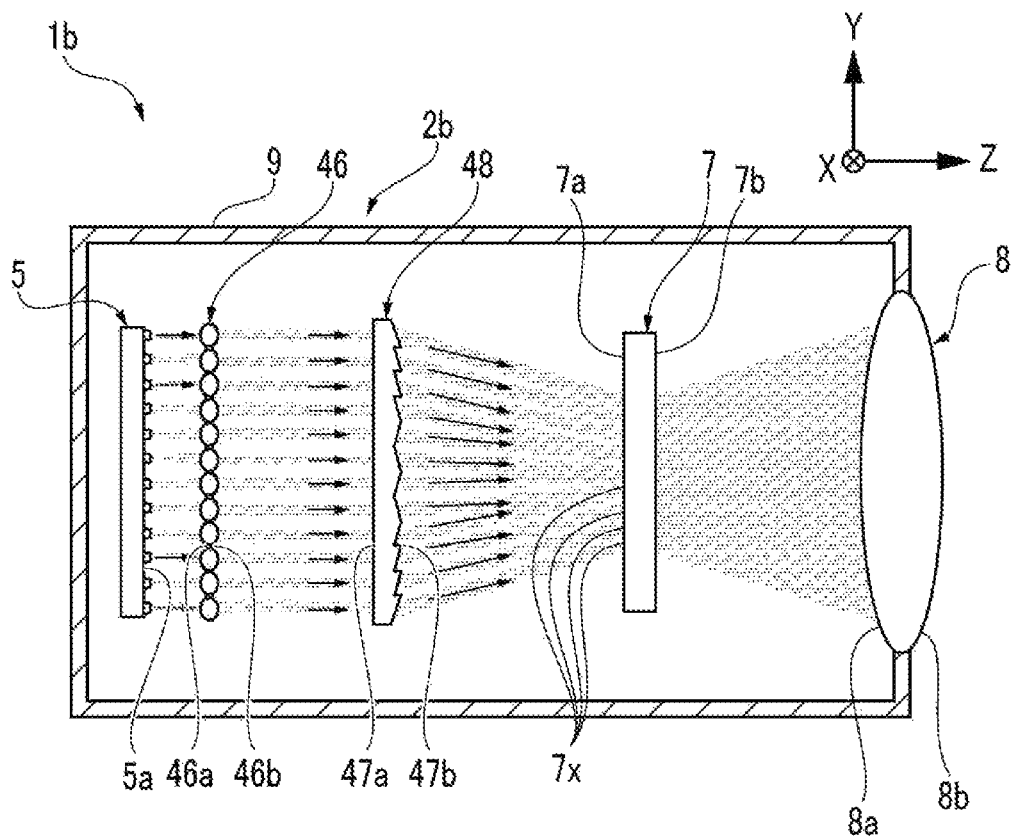
FIG. 5 is a schematic diagram showing the inside of an illumination unit of a vehicular headlight according to a second embodiment.

FIG. 5 is a schematic view showing the inside of an illumination unit 2b of a vehicular headlight 1b. In the illumination unit 2b, structural parts identical to those of the illumination unit 2a in FIG. 1 are indicated by the same reference numerals, and descriptions thereof are omitted. Differences thereof from the illumination unit 2a will be described.

The traveling directions of the respective lights (respective luminous fluxes) indicated by the arrows in FIG. 5 are schematically shown in the same manner as in FIG. 1. Accurate traveling directions will be described later with reference to FIGS. 7B and 7C.

The VCSEL array 5, a lens array 46, a prism member 48, the light distribution pattern forming unit 7, and the projection unit 8 are disposed in the housing 9 of the illumination unit 2b with their center axes aligned with each other. That is, the lens array 6 of the illumination unit 2a is replaced with the lens array 46 and the prism member 48 in the illumination unit 2b.

On the light emitting surface 5b side of the VCSEL array 5, the lights emitted from the respective VCSELs 14 pass through the light incident surface 46a and the light outgoing surface 46b of the lens array 46, and the light incident surface 47a and the light outgoing surface 47b of the prism member 48 in order and then reach the light incident surface 7a of the light distribution pattern forming unit 7. The lens array 46 and the prism member 48 serve as a first optical unit and a second optical unit, respectively, to constitute one image generating unit.

Figure 6:
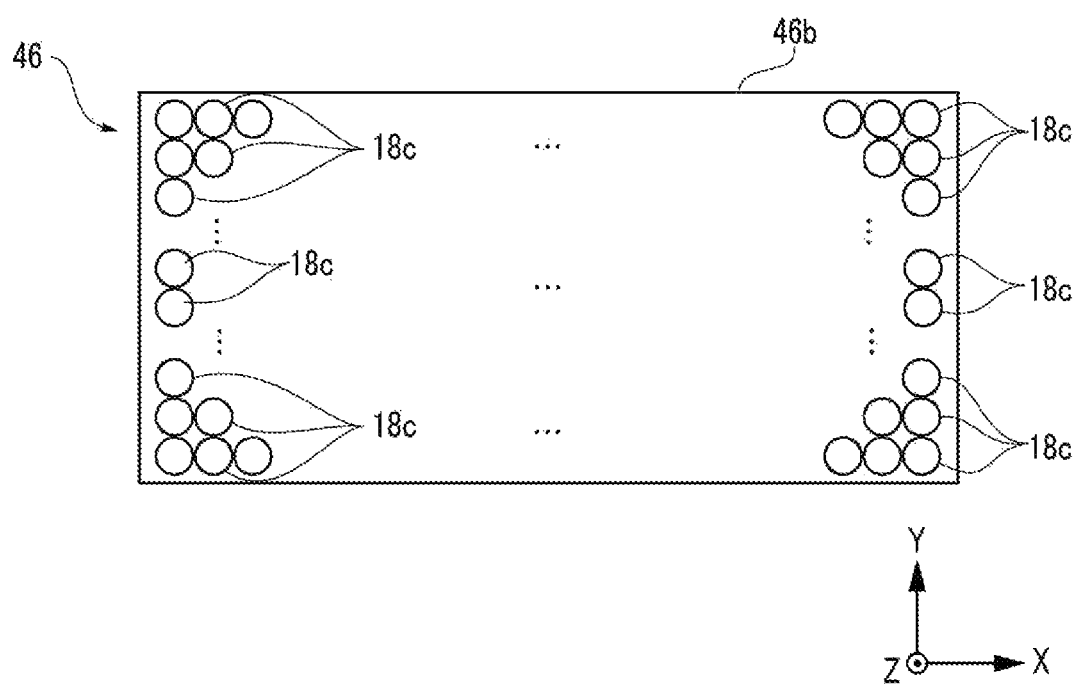
FIG. 6 is a front view of a lens array in FIG. 5.

FIG. 6 is a front view of the lens array 46 of FIG. 5. The lens array 46 includes collimator lenses 18c. Although the collimator lenses 18c are disposed at the same positions as the collimator lenses 18a and 18b of the lens array 6 in FIG. 2B, the adjustment of the directions of the outgoing lights differs from the adjustment of the directions of the outgoing lights by the collimator lenses 18a and 18b In other words, the collimator lenses 18c do not change the directions of the incident lights which have been emitted from the respective VCSELs 14 of the VCSEL array 5 and been incident thereon parallel to the center axis while slightly spreading in the radial direction, but output the incident lights as collimated lights travelling straight ahead. Therefore, the outgoing directions of the lights from the collimator lenses 18c are aligned parallel to the center axis of the lens array 46.

FIG. 7A is a front view of the prism member 48, FIG. 7B is an optical path diagram when the vehicular headlight 1b includes the prism member 48a as a first example, and FIG. 7C is an optical path diagram when the vehicular headlight 1b includes the prism member 48b as a second example. When the prism members 48a and 48b are described while not being distinguished from each other, they are collectively referred to as a "prism member 48."

The prism member 48 is sectioned into three sections in the longitudinal direction, i.e., an upper section 49a, a middle section 49b, and a lower section 49c in order from the top. The light outgoing surface as the front surface side of the prism member 48 has unevenness whereas the light incident surface 47a (FIG. 7B and FIG. 7C) as the back surface side is formed of one plane (flat).

Each of the prisms 50a has an inclined surface 51b inclined at an angle other than a right angle with respect to the light incident surface 47a, and an overhanging surface 51c overhanging toward the light distribution pattern forming unit 7 at a right angle with respect to the light incident surface 47a, on the light outgoing surface 47b of the prism member 48a. In each of the prisms 50a, the outgoing light La is outputted only from the inclined surface 51b. The inclined surface 51b of the prism 50a of the upper section 49a and the inclined surface 51b of the prism 50a of the lower section 49c are opposite to each other in terms of the direction of inclination in the longitudinal direction with respect to the light incident surface 47a. The inclined surface 51b of each of the prisms 50a is inclined with respect to the light incident surface 47a more greatly (at an angle closer to a right angle) as it is arranged closer to the end side in the longitudinal direction in the prism member 48a.

Each of the prisms 50b has two inclined surfaces 51f (hereinafter the "two inclined surfaces" are appropriately referred to as a "pair of inclined surfaces 51f") inclined at an angle other than a right angle with respect to the light incident surface 47a on the light outgoing surface 47b of the prism member 48a. In each of the prisms 50b, the outgoing light Lb is outputted from each inclined surface 51f. The inclined surfaces 51f of the prism 50b have opposite directions of inclination in the longitudinal direction with respect to the light incident surface 47a between the inclined surface 51*f* located on the upper section 49*a* side and the inclined surface 51*f* of the prism 50*b* located on the lower section 49*c* side, with the center in the longitudinal direction of the prism member 48*a* as a boundary.

With respect to each pair of inclined surfaces 51*f*, the inclined surface 51*b* on the end side in the longitudinal direction of the prism member 48*a* is inclined more greatly with respect to the light incident surface 47*a* than the inclined surface 51*b* on the center side. Among the inclined surfaces 51*b* on the end side or the inclined surfaces 51*b* on the center side, the closer it is arranged to the end side in the longitudinal direction, the more greatly it is inclined with respect to the light incident surface 47*a*.

The column interval of the prisms 50*a* is equal to the column interval of the collimator lenses 18*c* of the lens array 46, and is set to Da. In each of the prisms 50*b*, the dimension in the longitudinal direction of each inclined surface 51*b* of the pair of inclined surfaces is set to be equal to Da, and the dimension in the longitudinal direction of each prism 50*b* is 2·Da.

One number is assigned to one prism 50*a* in the longitudinal direction, and one number is assigned to each inclined surface of the prism 50*b*. Therefore, two numbers are assigned to the prism 50*b*. The numbers are determined to be No. 1, No. 2, . . . (in the embodiment in which 50 columns of the above-mentioned VCSELs 14 exist, the largest number is No. 50) in order from the top in the longitudinal direction.

The respective prisms 50*a* output collimated lights, which are incident from all the collimator lenses 18*c* of the same column number in parallel to the center axis, through the inclined surfaces 51*b* and 51*f* toward the upper section 26*a* or the lower section 26*c* of the light incident surface 7*a* as outgoing lights La. When reaching the light incident surface 7*a*, the outgoing lights La do not overlap with each other in the longitudinal direction on the light incident surface 7*a*, and are aligned at the incident light pitch Db in the longitudinal direction.

Collimated lights that are coming in parallel with the center axis from all the collimator lenses 18*c* having the same column numbers as those of the two inclined surfaces 51*f* enter the respective prisms 50*b*. Then, the lights are outputted as the outgoing lights Lb from the inclined surfaces 51*f* having the corresponding column numbers toward the middle section 26*b* of the light incidence surface 7*a*. When reaching the light incident surface 7*a*, the two outgoing lights Lb outputted from the same prism 50*b* overlap with each other in the longitudinal direction on the light incident surface 7*a*, and are arranged in the middle section 26*b* at the incident light pitch Db.

The incident light pitch Db on the light incident surface 7*a* of the light distribution pattern forming unit 7 is an alignment interval in the longitudinal direction of the light incident points 7*x* generated on the light incident surface 7*a* by allowing the outgoing lights La and Lb from the prism member 48*a* to be incident on the light incident surface 7*a* of the light distribution pattern forming unit 7. In the prism member 48*a*, the inclination angles of the inclined surfaces 51*b* and 51*f* of the respective prisms 50*a* and 50*b* are set with respect to the light incident surface 47*a* so that the incident light pitches Db on the light incident surface 7*a* become equal regardless of the longitudinal position on the light incident surface 7*a*.

As a result, the high illuminance portion Mb is generated in the middle section 26*b*, and the low illuminance portion Ma is generated in each of the upper section 26*a* and the lower section 26*c*. The illuminance of the high illuminance portion Mb is twice the illuminance of the low illuminance portion Ma.

The prism member 48*b* in FIG. 7C will be described. The prism member 48*b* has prisms 50*c* formed in the upper section 49*a* and the lower section 49*c*, and a prism 50*d* formed in the middle section 49*b*. The prisms 50*c* generate the low illuminance portions Ma on the light incidence surface 7*a* of the light distribution pattern forming unit 7. The prisms 50*d* generate the high illuminance portion Mb on the light incidence surface 7*a* of the light distribution pattern forming unit 7.

Each of the prisms 50*c* has an inclined surface 51*h* inclined at an angle other than a right angle with respect to the light incident surface 47*a*, and an overhanging surface 51*i* overhanging toward the light distribution pattern forming unit 7 at a right angle with respect to the light incident surface 47*a*, on the light outgoing surface 47*b* of the prism member 48*b*. In each of the prisms 50*c*, the outgoing light La is outputted only from the inclined surface 51*h*. The inclined surface 51*h* of the prism 50*c* of the upper section 49*a* and the inclined surface 51*h* of the prism 50*c* of the lower section 49*c* are opposite to each other in terms of the direction of inclination in the vertical direction with respect to the light incident surface 47*a*. The inclined surface 51*h* of each of the prisms 50*c* is inclined with respect to the light incident surface 47*a* more greatly as it is arranged closer to the end side in the longitudinal direction in the prism member 48*b*.

Each of the prisms 50*d* has three inclined surfaces 51*k* (hereinafter the "three inclined surfaces" are appropriately referred to as a "set of inclined surfaces 51*k*") inclined at an angle other than a right angle with respect to the light incident surface 47*a* on the light outgoing surface side of the prism member 48*b*. In each of the prisms 50*d*, the outgoing light Lb is outputted from each inclined surface 51*k*. The inclined surfaces 51*k* of the prism 50*d* have opposite directions of inclination in the longitudinal direction with respect to the light incident surface 47*a* between the inclined surface 51*k* located on the upper section 49*a* side and the inclined surface 51*k* of the prism 50*d* located on the lower section 49*c* side, with the center in the longitudinal direction of the prism member 48*b* as a boundary. Here, for convenience of description, the three inclined surfaces 51*k* of each set are referred to as "the inclined surface 51*k* on the end side," "the inclined surface 51*k* in the middle," and "the inclined surface 51*k* on the center side" in order from the end side to the center side in the longitudinal direction of the prism member 48*b*. In each set, the inclination angle with respect to the light incident surface 7*a* becomes greater in the order of "the inclined surface 51*k* on the center side", "the inclined surface 51*k* in the middle", and "the inclined surface 51*k* on the end side." Further, among the inclined surfaces 51*k* on the end side, the inclined surfaces 51*k* in the middle, or the inclined surfaces 51*k* on the center side, the closer it is arranged to the end side in the longitudinal direction, the more greatly it is inclined with respect to the light incident surface 47*a*.

The column interval of the prisms 50*c* is equal to the column interval of the collimator lenses 18*c* of the lens array 46, and is set to Da. In each of the prisms 50*d*, the dimension in the longitudinal direction of each of the set of inclined surfaces 51*k* is set to be equal to Da, and the dimension in the longitudinal direction of each prism 50*d* is 3·Da.

One number is assigned to the prism 50*c*, and one number is assigned to the prism 50*d* for each inclined surface 51*k* of the set. Therefore, three numbers are assigned to the prism 50*d*. The numbers are determined to be No. 1, No. 2, . . . (in the embodiment in which 50 columns of the above-mentioned VCSELs 14 exist, the largest number is No. 50) in order from the top in the longitudinal direction.

The respective prisms 50*a* output collimated lights, which are incident from all the collimator lenses 18*c* of the same column number in parallel to the center axis, through the respective inclined surfaces 51*h* toward the upper section 26*a* or the lower section 26*c* of the light incident surface 7*a* as outgoing lights La. When reaching the light incident surface 7*a*, the outgoing lights La do not overlap with each other in the longitudinal direction (are incident on different light incident points 7*x*) and are aligned at the incident light pitch Dc in the longitudinal direction.

Collimated lights that are coming in parallel with the center axis from all the collimator lenses 18*c* having the same column numbers as those of the respective inclined surfaces 51*k* enter the respective prisms 50*d*. Then, the lights are outputted as the outgoing lights Lb from the inclined surfaces 51*k* of the corresponding column numbers of one set of inclined surfaces 51*k* toward the middle section 26*b* of the light incidence surface 7*a*. When reaching the light incident surface 7*a*, the three outgoing lights Lb outputted from the same prism 50*d* in the longitudinal direction overlap with each other in the longitudinal direction (incident on the common light incident point 7*x*) and are arranged in the middle section 26*b* at the incident light pitch Dc.

The incident light pitch Dc on the light incident surface 7*a* of the light distribution pattern forming unit 7 is an alignment interval in the longitudinal direction of the light incident points 7*x* generated on the light incident surface 7*a* by allowing the outgoing lights La and Lb from the prism member 48*a* to be incident on the light incident surface 7*a* of the light distribution pattern forming unit 7. In the prism member 48*b*, the inclination angle of the inclined surface 51*h* of each prism 50*c* and the inclination angle of each inclined surface 51*k* of each prism 50*d* are set with respect to the light incident surface 47*a* so that the incident light pitches Dc on the light incident surface 7*a* become equal regardless of the longitudinal position on the light incident surface 7*a*.

As a result, the high illuminance portion Mb is generated in the middle section 26*b*, and the low illuminance portion Ma is generated in each of the upper section 26*a* and the lower section 26*c*. The illuminance of the high illuminance portion Mb is three times the illuminance of the low illuminance portion Ma.

In the illumination unit 2*b*, it is possible to use a common lens array 46 composed only of normal collimator lenses 18*c* which output lights parallel to the optical axis, so that cost can be reduced compared to the illumination unit 2*a*. On the other hand, the illumination unit 2*a* of FIG. 1 can be reduced in size by shortening the dimension in the optical axis direction because the prism member 48 can be omitted.

(ADB: Adaptive Driving Beam)

With reference to FIGS. 8 to 10B, a description will be given of the vehicular headlight 1, to which an ADB is applied, as an ADB unit 54. Note that the vehicular headlight 1 is considered as a generic name when the vehicular headlights 1*a* and 1*b* are not distinguished from each other.

FIG. 8 is a block diagram of the ADB device 54. The ADB device 54 includes a front monitoring camera 55, a light distribution pattern controlling device 56, and a switching device 57. The light distribution pattern controlling device 56 and the switching device 57 serve as a light source controlling unit configured to control luminance of the VCSEL array 5 as a light source. The front monitoring camera 55 may be provided exclusively for the vehicular headlight 1. When a peripheral monitoring device or a collision prevention device (not shown) has already been mounted on a vehicle (for example, the own vehicle 67 in FIG. 9) having been equipped with the vehicular headlight 1, it may be shared as the front monitoring camera 55. The illustrated embodiment shows the sharing of the front monitoring camera 55.

The front monitoring camera 55 generates a captured image in front of the own vehicle 67. The light distribution pattern controlling device 56 detects whether a forward vehicle such as an oncoming vehicle 68 or a preceding vehicle is present or not in front of the own vehicle 67 on the basis of the captured image from the forward monitoring camera 55. When a forward vehicle is present, the position and dimension of the forward vehicle on the captured image (for example, corresponding to the position and dimension of the oncoming vehicle 68 of FIGS. 10A and 10B) are detected.

The switching device 57 switches turned-on and turned-off of the switches provided for each VCSEL 14 of the VCSEL array 5, so that the VCSELs 14 can be switched on and off individually, pair by pair, or set by set. The VCSELs 14 emitting the light that will pass through the collimator lenses 18*a* and the prisms 50*a*, 50*c* can be switched on and off individually. The VCSELs 14 emitting the light that will pass through the collimator lenses 18*b* and the prisms 50*b* of FIG. 7B can be switched on and off for each pair thereof that are longitudinally adjacent to each other. The VCSELs 14 emitting the light that will pass through the prisms 50*d* of FIG. 7C can be switched on and off for each set thereof which includes three consecutive VCSELs 14 in the vertical direction as a set.

The light distribution pattern controlling device 56 turns off the VCSELs 14 corresponding to the forward vehicle and turns on the other VCSELs 14 so that the driver of the forward vehicle is not dazzled by the illumination light from the vehicular headlight 1 while the VCSELs 14 of the vehicular headlight 1 are based on the high beam (lighting of all VCSELs 14). The forward vehicle includes at least an oncoming vehicle 68 (FIG. 9) with respect to the own vehicle 67 (FIG. 9), and includes a preceding vehicle as appropriate. This is because the driver of the preceding vehicle may be dazzled by the light of the vehicular headlight 1*a* of the own vehicle 67 which appears on the room mirror or the side mirror. The control of turning on and off of the VCSELs 14 by the light distribution pattern controlling device 56 is performed via turning on and off the respective switches by the switching device 57.

Figure 9:
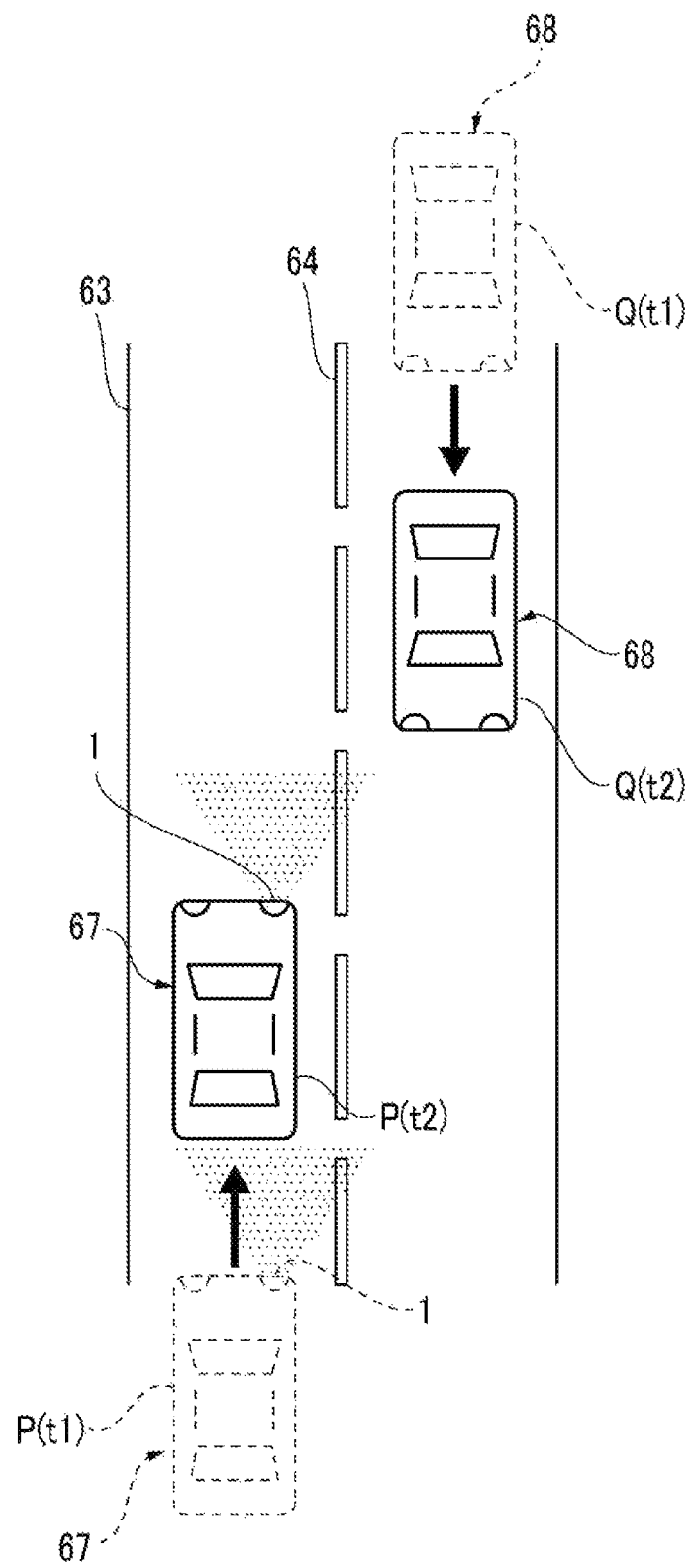
FIG. 9 is an explanatory view of an example in which the ADB is used.

FIG. 9 is an explanatory diagram of a use example of ADB. The own vehicle 67 is equipped with the vehicular headlight 1 having an ADB function, and travels in a left lane of a road 63 which is separated from the right and left by a center line 64. On the other hand, the oncoming vehicle 68 travels in a lane opposite to that of the own vehicle 67 toward the own vehicle 67. The positions P (t1) and P(t2) indicate the positions of the own vehicle 67 at the times t1 and t2, respectively. Positions Q(t1) and Q(t2) indicate positions of the oncoming vehicle 68 at times t1 and t2. The time t2 is a time after the time t1.

Figure 10A:
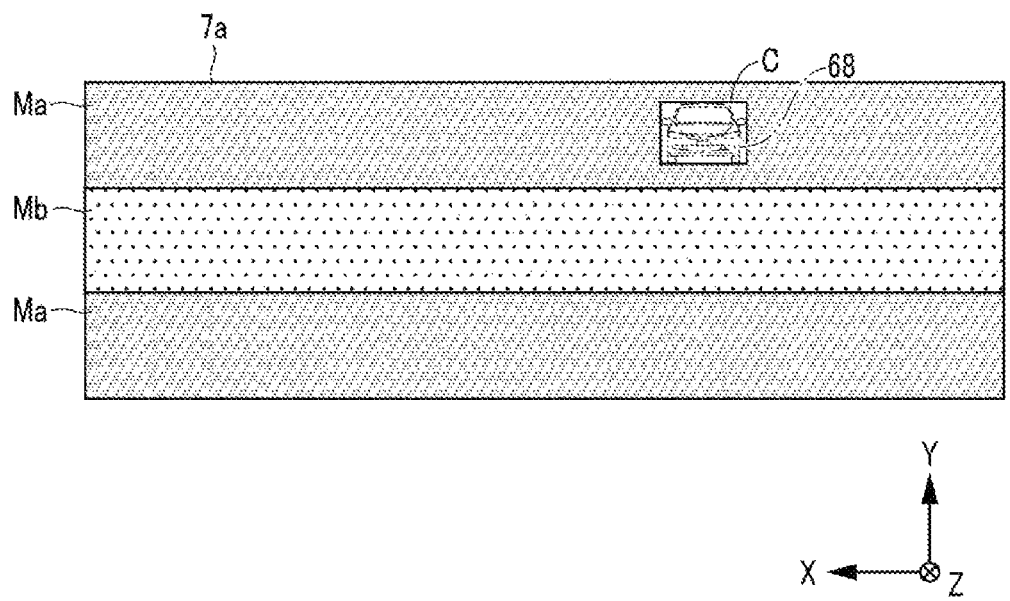
FIG. 10A is a diagram showing an illuminance distribution generated on a light incident surface of a light distribution pattern forming unit by a vehicular headlight under the driving condition of FIG. 9.
Figure 10B:
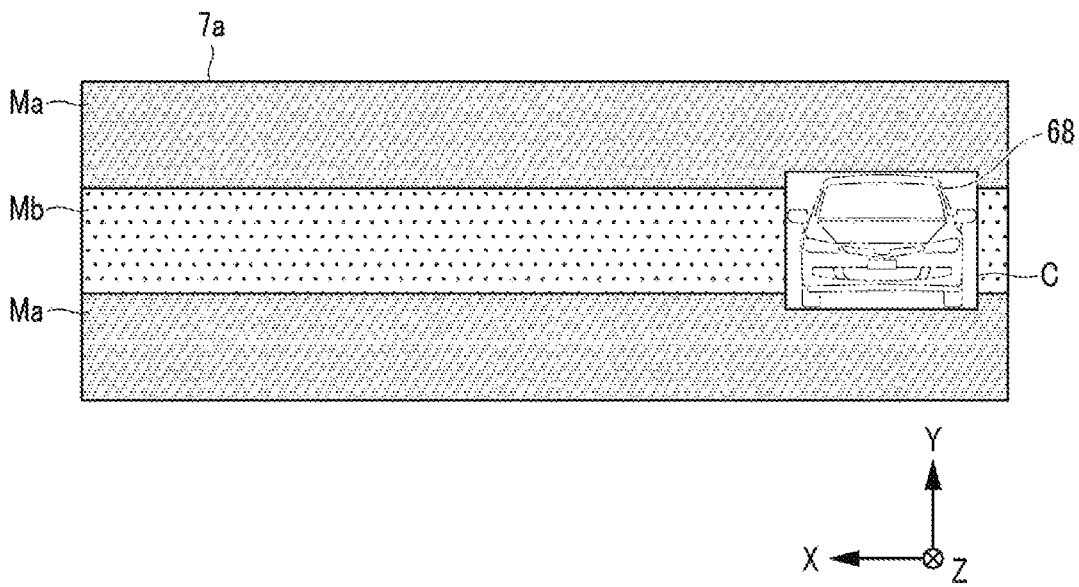
FIG. 10B is a diagram showing an illuminance distribution generated on a light incident surface of a light distribution pattern forming unit by a vehicular headlight under the driving condition of FIG. 9 at a time different from that of FIG. 10A.

FIGS. 10A and 10B show illuminance distributions generated on the light incidence surface 7*a* of the light distribution pattern forming unit 7 at times t1 and t2, respectively, by the vehicular headlight 1 in the driving situation of FIG. 9. The illuminance distribution matches with the light distribution pattern of the irradiation region generated by the vehicular headlight 1 by the own vehicle 67.

In FIGS. 10A and 10B, a captured image of the oncoming vehicle 68 is illustrated in the mask region C together with the mask region C (no irradiation region). This is shown for convenience in order to facilitate the understanding of the relation between the corresponding position and corresponding size of the captured image of the oncoming vehicle 68 and the position and size of the mask region C on the light incident surface 7a at the times t1 and t2, and the captured image of the oncoming vehicle 68 does not actually appear on the light incident surface 7a.

Hereinafter, the captured image of the oncoming vehicle 68 illustrated in FIGS. 10A and 10B will be referred to as a "virtual image" of the oncoming vehicle 68. The light distribution pattern controlling device 56 generates the mask region C so as to have a rectangle circumscribing the virtual image.

The relative distance between the own vehicle 67 and the oncoming vehicle 68 on the road 63 decreases as time goes on from time t1 to time t2. Therefore, the dimension of the oncoming vehicle 68 on the light incident surface 7a becomes larger at the time t2 than at the time t1, and the position becomes closer to the right at the time t2 than at the time t1.

The collimator lenses 18b of the lens array 6 or the prisms 50b and 50d of the prism members 48a and 48b cause a plurality of laser lights to overlap with each other in the middle section 26b of the light incidence surface 7a of the light distribution pattern forming unit 7 in the longitudinal direction. Therefore, in the light incidence surface 7a of the light distribution pattern forming unit 7, the upper section 26a and the lower section 26c become the low illuminance portion Ma, and the middle section 26b becomes the high illuminance portion Mb.

Then, the ADB function can generate the mask region C as a circumscribed rectangle including the corresponding part of the oncoming vehicle 68 inside the mask region C on the light incident surface 7a. The light distribution pattern controlling device 56 stops energization for the VCSELs 14 that emit the light directed to the mask region C, so that the VCSELs 14 are turned off. As a result, the illuminance of the mask region C becomes 0, and the illumination to the oncoming vehicle 68 by the vehicular headlight 1a is stopped. The position, size, and number of the mask region C on the light incident surface 7a dynamically change in accordance with the position, size, and number of the forward vehicle.

Third Embodiment

Figure 11:
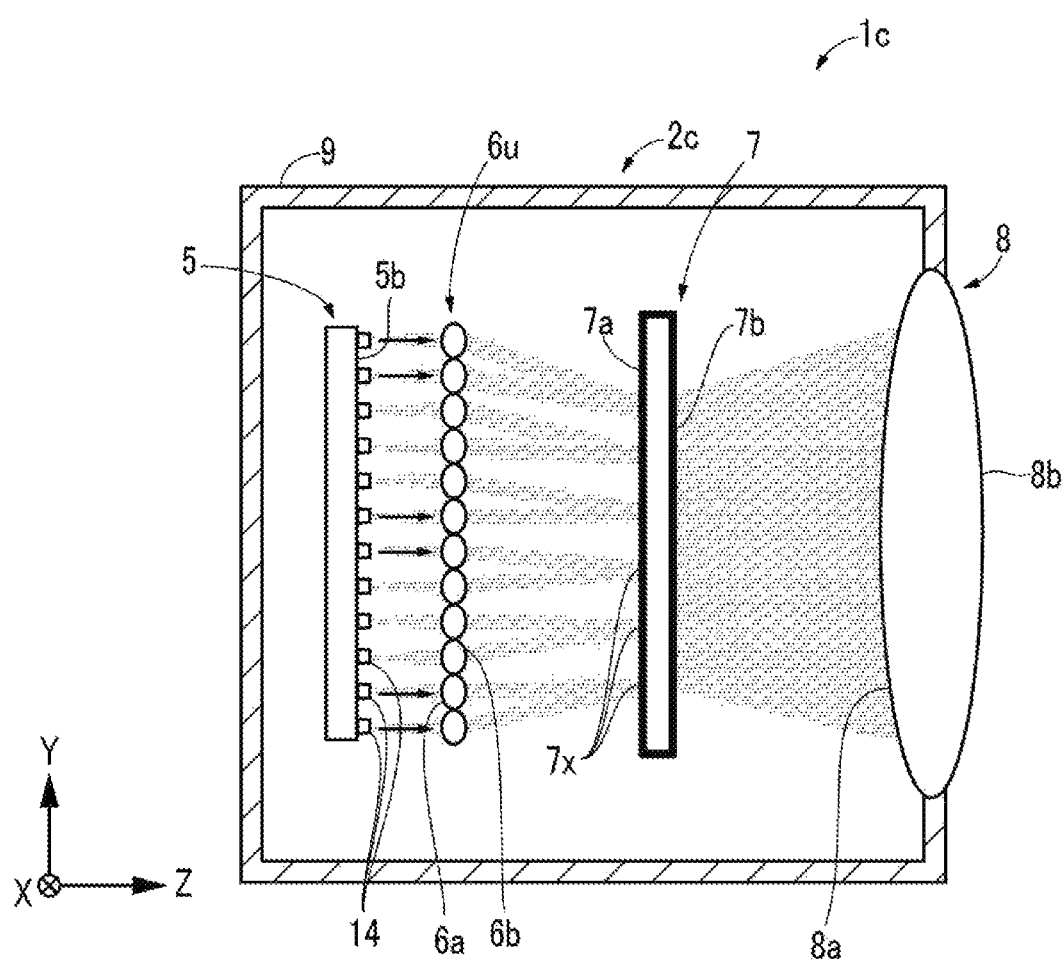
FIG. 11 is a schematic diagram showing the inside of an illumination unit of a vehicular headlight according to a third embodiment.

FIG. 11 is a schematic diagram showing the inside of an illumination unit 2c of a vehicular headlight 1c. The vehicular headlight 1c is equipped with a lens array 6u instead of the lens array 6 of the vehicular headlight 1a (FIG. 1).

A predetermined plurality (two in FIG. 11) of outgoing lights from the light outgoing surface 6b of the lens array 6u are incident on the common light incident point 7x (FIG. 12) on the light incident surface 7a of the light distribution pattern forming unit 7. Since the plurality of outgoing lights from the lens array 6u are incident on the common light incident point 7x of the light incident surface 7a of the light distribution pattern forming unit 7, the illuminance of the light incident point 7x becomes higher (brighter) than that when a single outgoing light from the light outgoing surface 6b of the lens array 6u is incident on the light incident point 7x.

Figure 12:
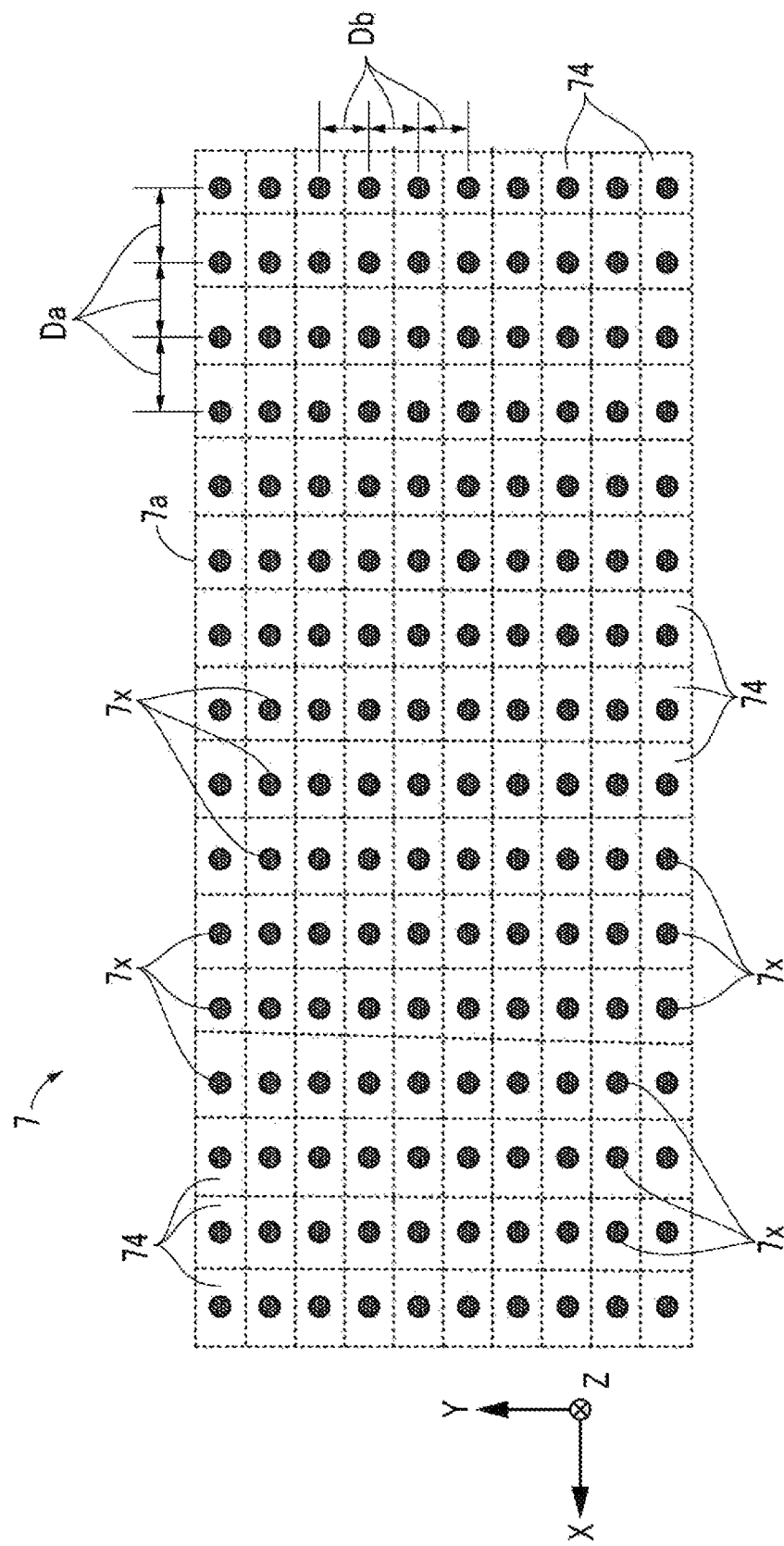
FIG. 12 is a diagram showing a distribution of light incident points on a light incident surface of the light distribution pattern forming unit of FIG. 11.

FIG. 12 is a diagram showing a distribution of the light incident points 7x on the light incident surface 7a of the light distribution pattern forming unit 7 in the vehicular headlight 1c. The light distribution pattern forming unit 7 may be a phosphor plate as illustrated in FIGS. 3A to 3C, but the light distribution pattern forming unit 7 described here is a plate-like translucent light scattering unit. For the sake of simplicity, the number of light incident points 7x shown in FIG. 12 is significantly smaller than the number of light incident points in actual products.

The light incident points 7x are distributed in equal density on the light incident surface 7a. In the illustrated example, the dimension Da in the X-axis direction of the light incident point 7x is larger than the dimension Db in the Y-axis direction (dimension Da>dimension Db). The distribution of the light incident points 7x on the light incident surface 7a may be set to satisfy the dimension Da=the dimension Db or the dimension Da<the dimension Db, provided that the distribution of the light incident points 7x is maintained in equal density.

The light incident surface 7a is sectioned into a plurality of sections 74. Each of the sections 74 contains only one light incident point 7x thereinside. Each of the light incident points 7x is located at the center of each of the sections 74. The light incident surface 7a is a collection of the plurality of sections 74, and an optional position of the light incident surface 7a is included in anyone of the sections 74. The dimensions of the section 74 are set such that the illuminance of the section 74 is not affected by the illuminance of the light incident point 7x present in the section 74 adjacent to the said section 74, and the predetermined illuminance stage changes in accordance with the change of the illuminance of the single light incident point 7x present inside that section 74.

FIG. 13 shows the arrangement state of VCSELs 14 on the light emitting surface 5b of the VCSEL array 5. For convenience of illustration, each circle in FIG. 13 indicates the light emission point of each VCSEL 14, and does not indicate the actual form of the VCSEL 14. The VCSELs 14 are disposed at equal intervals of the dimension Dc in the longitudinal and transversal directions on the light emitting surface 5b.

The predetermined plurality (four in the illustrated example) of VCSELs 14 constitute a group 154. The group 154 and the light incident point 7x in FIG. 12 are associated with each other in a one-to-one correspondence. That is, for the VCSEL 14 belonging to the same group 154, after emitting light parallel to the Z-axis, the light is changed in direction when passing through the corresponding collimator lens 163 of the lens array 6u, and reaches the common light incident point 7x of the light distribution pattern forming unit 7.

FIG. 14 shows the arrangement state of the collimator lenses 163 on the light emitting surface 6b of the lens array 6u. For convenience of illustration, each circle in FIG. 14 indicates the center portion of each collimator lens 163, and differs from the actual shape of the collimator lens 163. Each of the collimator lenses 163 is associated with each VCSEL 14 of the VCSEL array 5 in a one-to-one correspondence. Light enters each of the collimator lenses 163 from a corresponding one of the VCSELs 14 of the VCSEL array 5.

The collimator lenses 163 also constitute groups 164 in accordance with the groups 154 of the VCSELs 14 of the VCSEL array 5. The group 164 and the light incident point 7x in FIG. 12 are associated with each other in a one-to-one correspondence. When lights emitted from the respective VCSELs 14 belonging to the same group 164 pass through the lens array 6u, the directions of the emission lights are changed and reach the common light incident point 7x of the light distribution pattern forming unit 7.

Fourth Embodiment

Figure 15A:
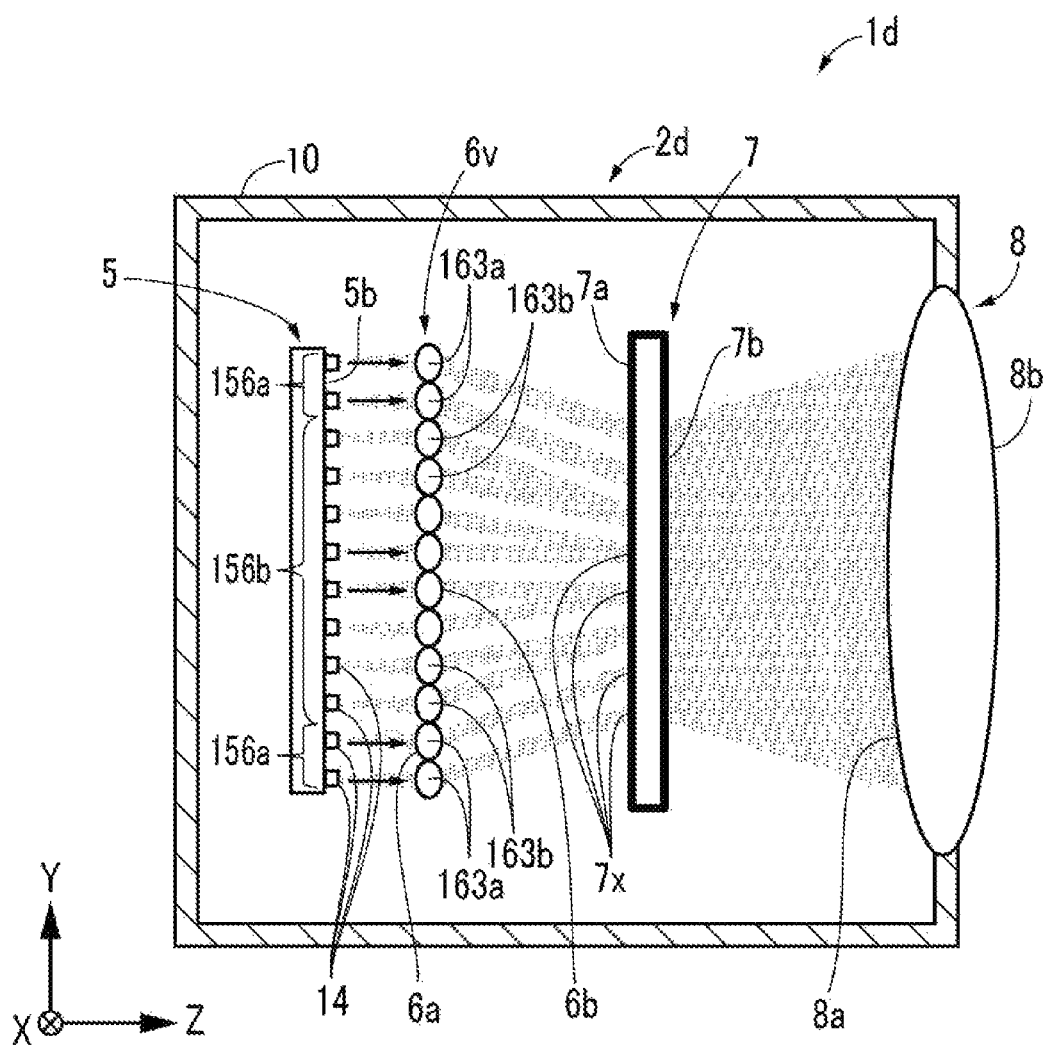
FIG. 15A is a schematic diagram showing the inside of an illumination unit of a vehicular headlight according to a fourth embodiment.
Figure 15B:
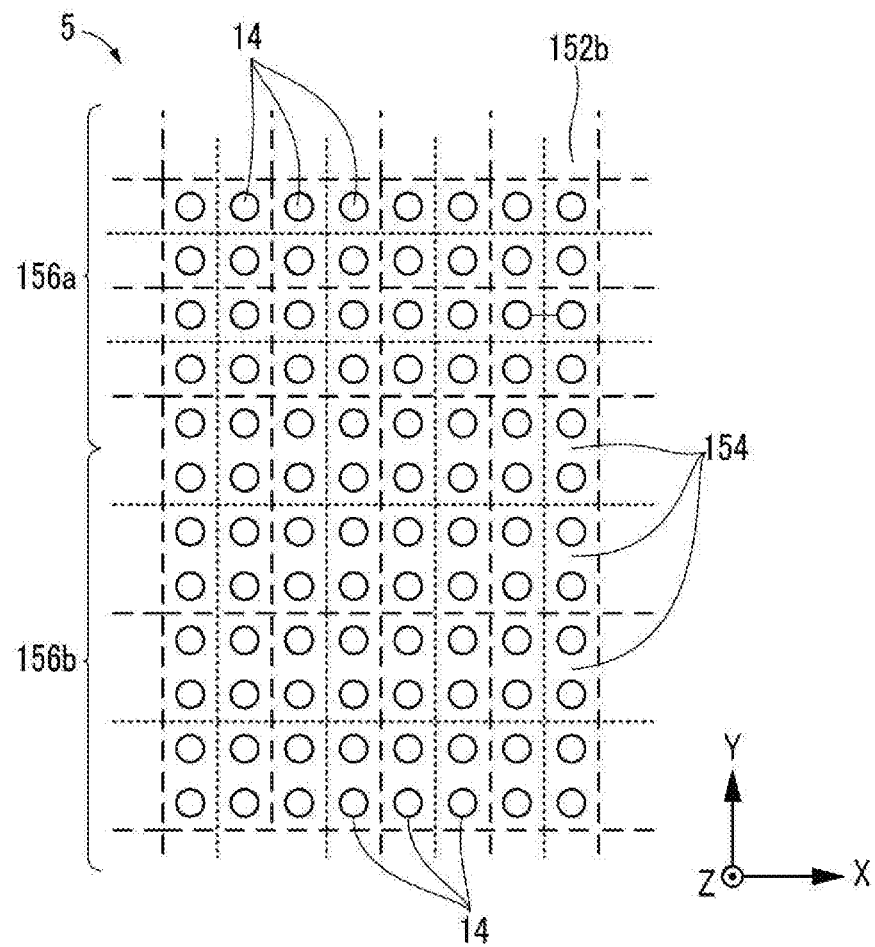
FIG. 15B is a diagram showing a group configuration of VCSELs in the monolithic array light source of FIG. 15A.

FIG. 15A is a schematic diagram of an illumination unit 2d of a vehicular headlight 1d of the fourth embodiment, and FIG. 15B is a diagram showing the group configuration of the VCSELs 14 in the VCSEL array 5.

In the illumination unit 2d of FIG. 15A, elements identical to those in the illumination unit 2a of FIG. 1 are designated by the same reference numerals as those used for the illumination unit 2a. In the illumination unit 2d, a lens array 6v is provided instead of the lens array 6u of the illumination unit 2c (FIG. 11). Part of the light from the VCSEL array 5 is not subjected to an optical treatment in which a plurality of lights are superimposed on the light incidence surface 7a of the light distribution pattern forming unit 7 in the lens array 6v. That is, the incident lights having entered the light incident surface 6a of the lens array 6v from the VCSEL array 5 at both ends in the Y-axis direction are changed in direction so as to be incident on the dedicated light incident points 7x of the light incident surface 7a of the light distribution pattern forming unit 7, and are outputted from the collimator lens 163. In other words, the light incident points 7x on the light incident surface 7a of the light distribution pattern forming unit 7 are assigned in a one-to-one correspondence with the incident lights having entered the light incident surface 6a of the lens array 6v from the VCSEL array 5 at both ends in the Y-axis direction.

In FIG. 15B, the light emitting surface 5b of the VCSEL array 5 is sectioned into regions 156a on both end sides (only one end side is shown in FIG. 15B) and a region 156b on the center side in the Y-axis direction. The VCSELs 14 of the region 156a do not constitute a group 154, and only the VCSELs 14 of the region 156b form pairs of adjacent VCSELs 14 adjacent to each other in the Y-axis direction to constitute the group 154. That is, four VCSELs 14 in the vehicular headlight 1c (FIG. 11) constitute one group 154 for all the VCSELs 14, whereas two VCSELs 14 in the vehicular headlight 1d constitute one group 154 only for the VCSELs 14 present in the region 156b.

Whether the VCSELs 14 of the VCSEL array 5 constitute the group 154 or not is irrelevant to the structure of the VCSEL array 5 itself. When the light source controlling unit 131 (FIG. 16) controls turning on and off of the VCSELs 14 of the VCSEL array 5 or 5b, whether or not the light source controlling unit 131 (FIG. 16) controls the lighting as the group 154 is only changed.

On the other hand, as shown in FIG. 15A with respect to the lens array 6v, with regard to the incident lights from the VCSELs 14 of the region 156a onto the light incident surface 6a, the collimator lenses 163a each output one incident light from the light incident surface 62 so that the one incident light is incident on the corresponding one of the light incident points 7x. Further, with regard to the incident lights from the VCSELs 14 of the region 156b to the light incident surface 6a, the collimator lenses 163b each output two incident lights from the light incident surface 62 so that the two incident lights are incident on the corresponding one of the light incident points 7x.

Figure 16:
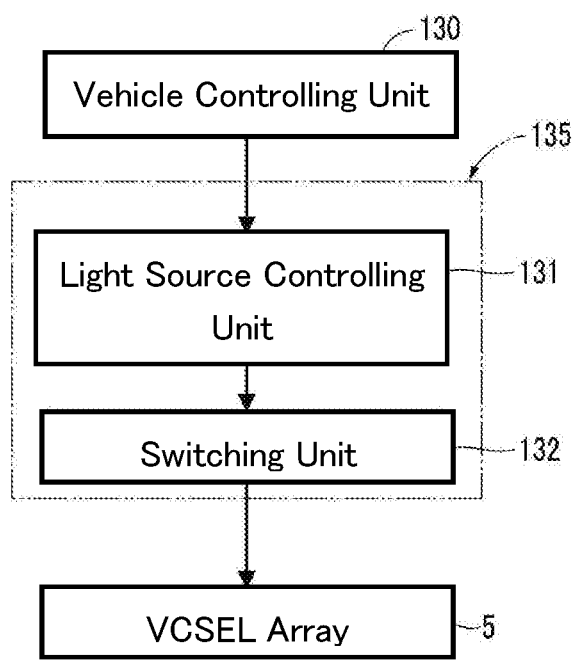
FIG. 16 is a block diagram of a controlling unit of the vehicular headlight of FIG. 15A.

Light Source Controlling Unit:

FIG. 16 is a block diagram of a controlling device 135 of the vehicular headlight 1c. The controlling device 135 includes a light source controlling unit 131 and a switching unit 132, and controls the VCSEL array 5 on the basis of data from the vehicle controlling unit 130. The vehicle controlling unit 130 is mounted on a vehicle on which the vehicular headlight 1c is mounted, collects information from various sensors mounted on the vehicle, and performs control of the entire vehicle (for example, travel control, engine control, route guidance, and air conditioning control) on the basis of the information.

The light source controlling unit 131 obtains desired data from the vehicle controlling unit 130 and controls the switching unit 132. The switching unit 132 can individually energize the VCSELs 14 of the VCSEL array 5 or stop energization to individually turn on and off the VCSELs 14. The light source controlling unit 131 controls the number of turned-on VCSELs 14 of each group 154 via the switching unit 132 on the basis of the data of the vehicle controlling unit 130. As a result, the illuminance distribution on the light incident surface 7a of the light distribution pattern forming unit 7 changes, and the light distribution pattern of the irradiation region in front of the vehicle irradiated with the illumination light as the outgoing light from the light outgoing surface 8b of the projection unit 8 changes.

The light source controlling unit 131 can detect the turning direction of the vehicle on the basis of the steering angle information of the steering wheel of the vehicle, on which the vehicular headlight 1c is mounted, from the vehicle controlling unit 130. The steering angle information of the steering wheel is used for AFS.

The light source controlling unit 131 also obtains target information of a relative direction, a relative distance, and a dimension (for example, a dimension in terms of an angle of view) of a person, an opposing vehicle, or a vehicle traveling in the same direction (hereinafter, referred to as a "target") with respect to the vehicle when the targets are present in front of the vehicle. The vehicle controlling unit 130 can extract the target information from, for example, a captured image of a camera that captures an image of the front of the vehicle. On the basis of the target information, the light source controlling unit 131 calculates which of the sections 74 the target occupies on the light incidence surface 7a.

Figure 17:
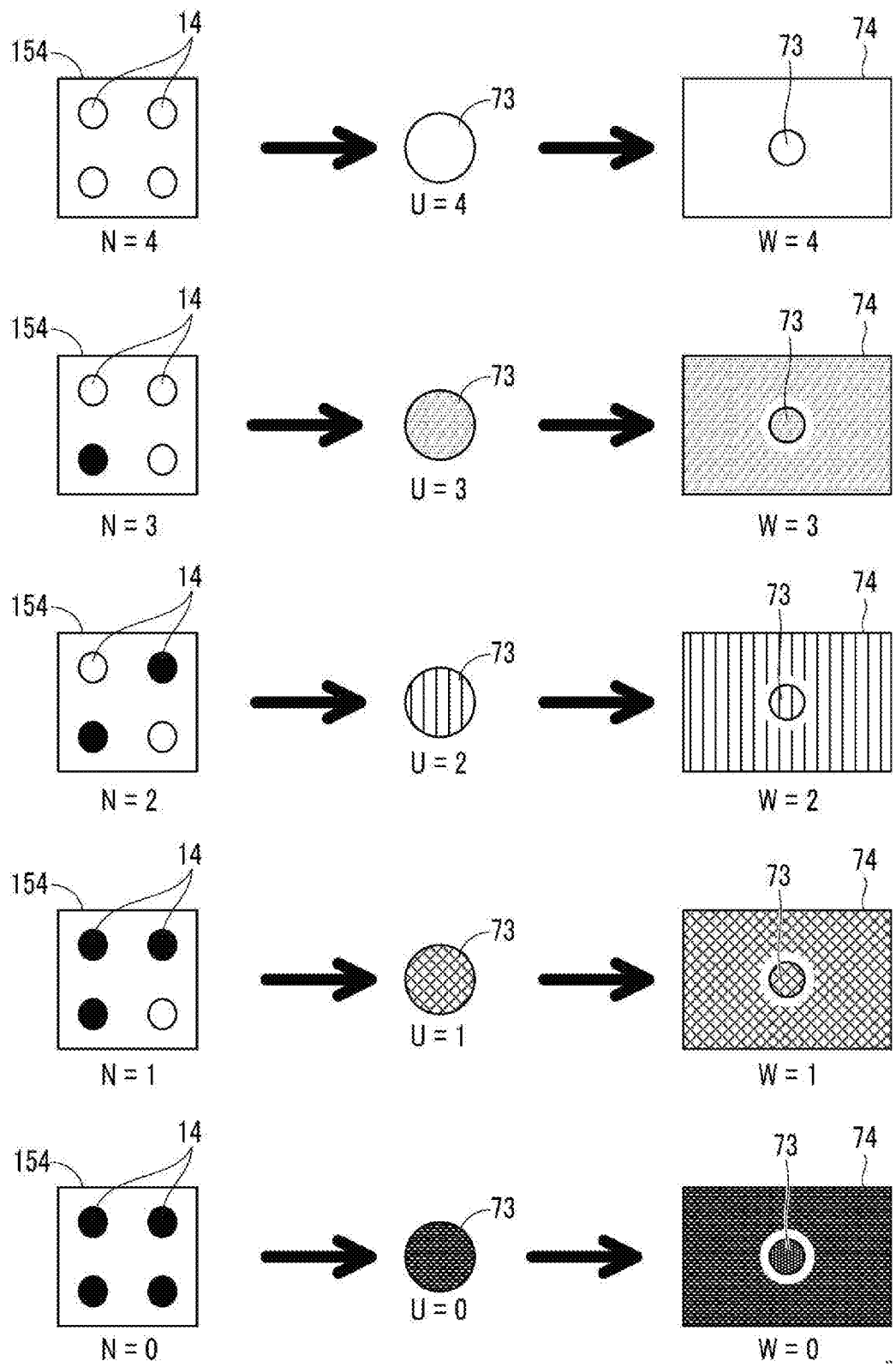
FIG. 17 is an explanatory view 1 of the relationship among the number of turned-on VCSELs for each group in the monolithic array light source, the illuminance of the light incident point of the light distribution pattern forming unit, and the illuminance stage of the section of the light distribution pattern forming unit.

FIG. 17 is an explanatory diagram of relationships among three parties: the number N of turned-on VCSELs 14 for each group 154 in the VCSEL array 5, the illuminance U of the light incident point 7x of the light distribution pattern forming unit 7, and the illuminance stage W of the section 74 of the light distribution pattern forming unit 7.

FIG. 17 shows the relationship of the number N of turned-on VCSELs and the like of the vehicular headlight 1c of FIG. 11. That is, the relationship in the VCSEL array 5 is satisfied when 2×2 pieces of VCSELs 14 in the longitudinal and transversal directions (in the Y-axis direction and the X-axis direction) constitute one group 154. In the VCSELs 14 of FIG. 17, a white circle means that the VCSEL 14 is turned on, and a black circle means that the VCSEL 14 is turned off.

This means that those having the same numerical values correspond to each other in terms of the number N of turned-on VCSELs, the illuminance U, and the illuminance stage W. The illuminance U and the illuminance stage W having a larger numerical value mean the brighter illuminance and the brighter illuminance stage W.

Since the maximum value of the number N of turned-on VCSELs is 4, the illuminance U of the light incident point 7x and the illuminance stage W of the section 74 are controlled in five stages from 0 to 4. The section 74 is formed as a section having only one light incident point 7x at a center position as an inside position. Since the illuminance U of the light incident point 7x corresponds to the number N of turned-on VCSELs 14 in the corresponding group 154, the illuminance stage W of the section 74 corresponds to the number N of turned-on VCSELs 14 in the corresponding group 154, and the illuminance U equals to the illuminance at the illuminance stage of the section 74. The illuminance stage W=4 means the maximum (brightest) illuminance stage W, and the illuminance stage W=0 means the minimum (darkest) illuminance stage W.

Figure 18C:
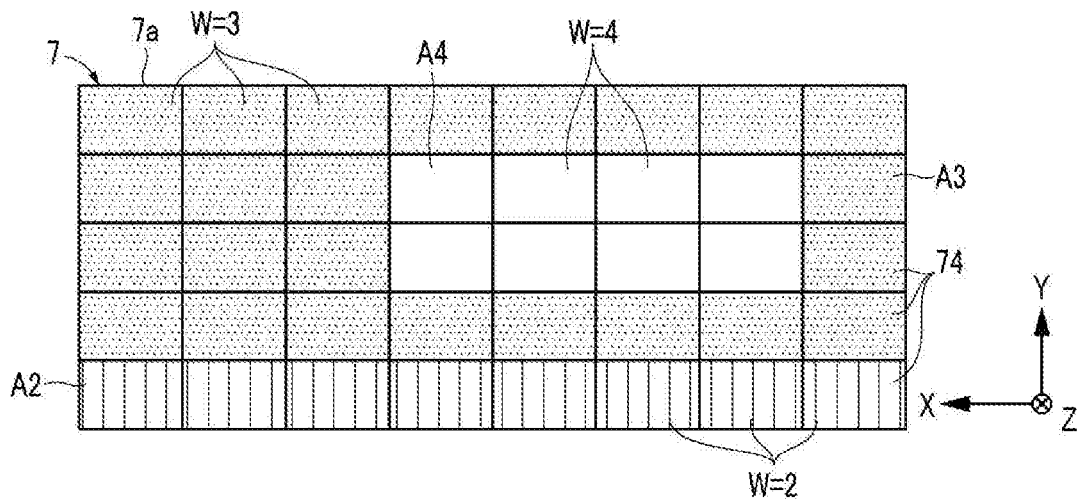
FIG. 18C is an illuminance distribution pattern diagram at the time of turning to the right.

AFS:

The irradiation region in front of the vehicle on which the vehicular headlight 1c is mounted is irradiated with irradiation light from the vehicular headlight 1c with a light distribution pattern corresponding to the illuminance distribution pattern. FIG. 18A shows an illuminance distribution pattern on the light incidence surface 7a of the light distribution pattern forming unit 7 controlled by the controlling device 135 when the vehicle is traveling straight. FIG. 18B shows an illuminance distribution pattern on the light incidence surface 7a of the light distribution pattern forming unit 7 controlled by the controlling device 135 when the vehicle turns left. FIG. 18C shows an illuminance distribution pattern on the light incidence surface 7a of the light distribution pattern forming unit 7 controlled by the controlling device 135 when the vehicle turns right.

In FIG. 18A, FIG. 18B, and FIG. 19, W4 to W0 denote sections 74 having illuminance stages W=4 to 0, respectively. A4 to A0 indicate regions in which a plurality of sections 74 of W4 to W0 are connected, respectively. W4 is an illuminance stage W in which the brightness is maximum in the light incident surface 7a. W0 is an illuminance stage W in which the brightness is minimum in the light incident surface 7a. The illuminance U of the light incident point 7x included in the section 74 of the illuminance stage W=0 is 0, and the illuminance U=0 means no incident light (mask region). That is, all the VCSELs 14 belonging to the group 154 corresponding to the light incident point 7x are turned off.

In the illuminance distribution pattern control of FIGS. 18A and 18B, three illuminance stages W=4, 3, and 2 of FIG. 17 are used, and the illuminance stages W=1 and 0 are not used. Therefore, the section 74 having the minimum brightness in the light incident surface 7a becomes the section 74 having the illumination stage W=2.

As shown in FIG. 18A, when the vehicle is travelling straight, the light source controlling unit 131 controls the number N of the turned-on VCSELs 14 of the respective groups 154 of the VCSEL array 5 so that the region A4 having the maximum luminance occupies the central portion and the regions A3 and A2 darker than the region A4 having the maximum luminance occupy the peripheral portions in the light incidence surface 7a of the light distribution pattern forming unit 7.

At the time of turning the vehicle to the left, as shown in FIG. 18B, the light source controlling unit 131 controls the number N of the turned-on VCSELs 14 of the respective groups 154 of the VCSEL array 5 so that the center of the region A4 having the maximum luminance moves from the center of the light incident surface 7a to the left in the light incident surface 7a of the light distribution pattern forming unit 7. The light source controlling unit 131 also controls the number N of the turned-on VCSELs 14 of the respective groups 154 of the VCSEL array 5 so that the regions A3 and A2 surrounding the region A4 having the maximum luminance move to the left as the region A4 moves to the left. Note that the amount of movement of the center of the region A4 to the left is proportional to the steering angle of the steering wheel to the left.

At the time of turning the vehicle to the right, as shown in FIG. 18C, the light source controlling unit 131 controls the number N of the turned-on VCSELs 14 of the respective groups 154 of the VCSEL array 5 so that the center of the region A4 having the maximum luminance moves from the center of the light incident surface 7a to the right in the light incident surface 7a of the light distribution pattern forming unit 7. The light source controlling unit 131 also controls the number N of the turned-on VCSELs 14 of the respective groups 154 of the VCSEL array 5 so that the regions A3 and A2 surrounding the region A4 having the maximum luminance move to the right as the region A4 moves to the left. Note that the amount of movement of the center of the region A4 to the right is proportional to the steering angle of the steering wheel to the right.

Figure 19A:
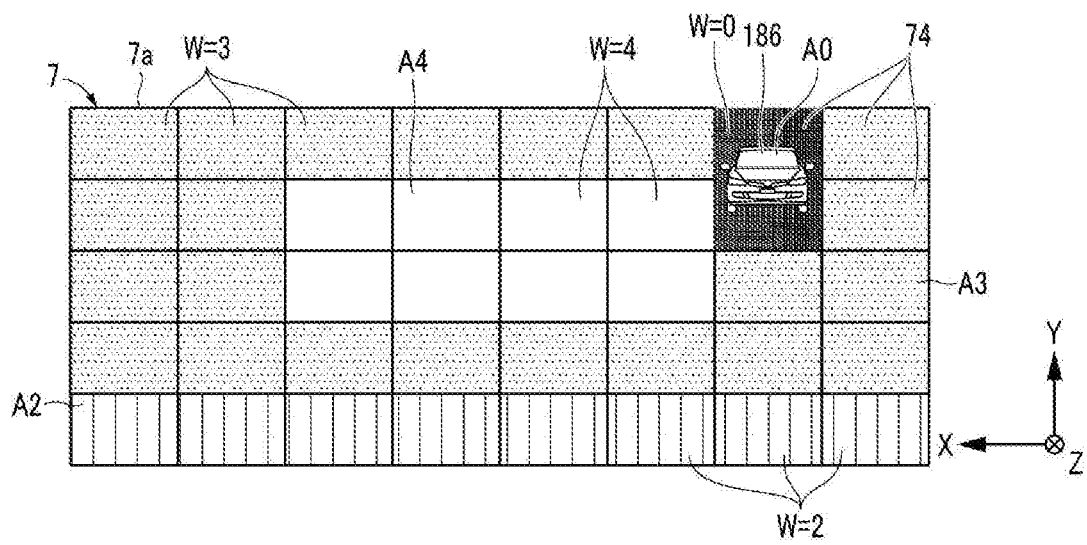
FIG. 19A is an illuminance distribution pattern diagram when an oncoming vehicle exists in a distant area.
Figure 19B:
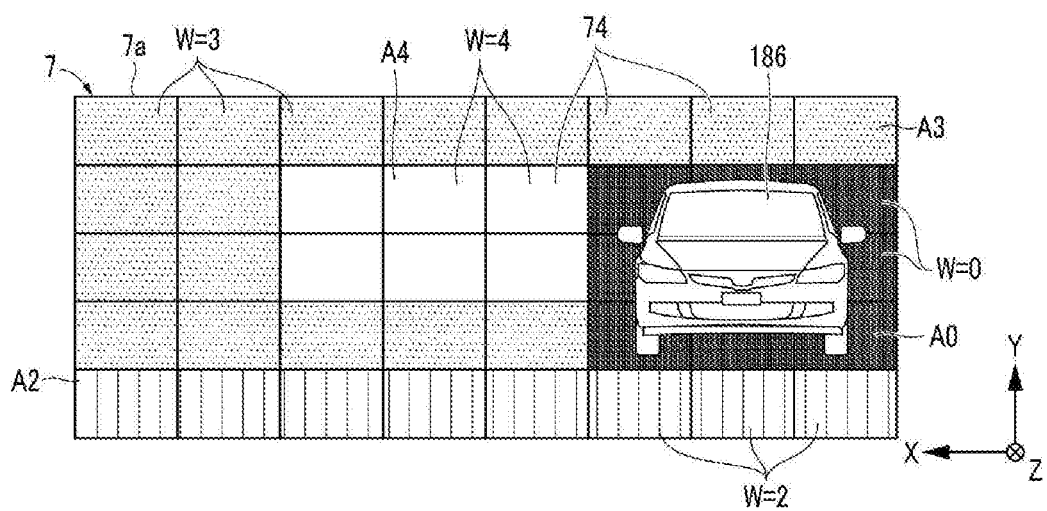
FIG. 19B is an illuminance distribution pattern diagram when an oncoming vehicle approaches.

ADB:

FIG. 19 shows an illuminance distribution pattern on the light incidence surface 7a of the light distribution pattern forming unit 7 based on ADB. FIG. 19A shows the illuminance distribution pattern when the oncoming vehicle 186 is located at a distance, and FIG. 19B shows the illuminance distribution pattern when the oncoming vehicle 186 approaches. The vehicle itself on which the vehicular headlight 1c is mounted travels straight in the left lane in the same manner as in the case of FIG. 18A.

On the basis of the data obtained from the vehicle controlling unit 130, the light source controlling unit 131 calculates which section 74 of the light incident surface 7a the oncoming vehicle 186 as the ADB target corresponds to. Then, for the section(s) 74 corresponding to the oncoming vehicle 186, all of the VCSELs 14 of the groups 154 corresponding to the light incident points 7x of the section(s) 74 are turned off so that the illuminance stage W thereof becomes 0. As a result, the driver of the oncoming vehicle 186 is prevented from being irradiated with the illumination light from the vehicle having the vehicular headlight 1c to be dazzled.

Fifth Embodiment

Figure 20:
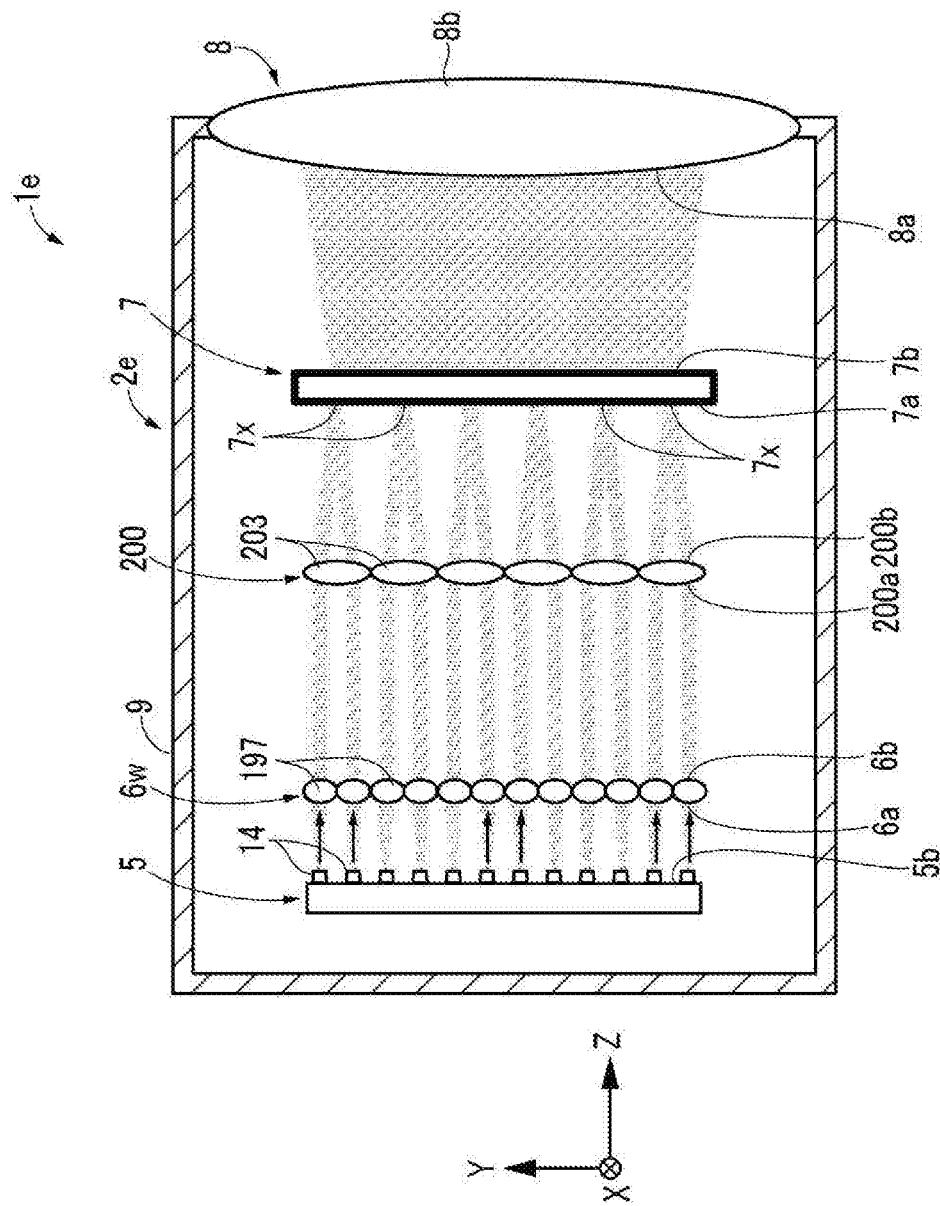
FIG. 20 is a schematic diagram showing the inside of the illumination unit of a vehicular headlight according to a fifth embodiment.

FIG. 20 is a schematic diagram showing the inside of an illumination unit 2e of a vehicular headlight 1e. The lens array 6u of the illumination unit 2c (FIG. 11) is replaced with a lens array 6w and a lens array 200 in the illumination unit 2e. In the vehicular headlight 1e, the lens array 6w corresponds to the first optical device, and the lens array 200 corresponds to the second optical device.

In the lens array 6w, the light incident surface 6a and the light outgoing surface 6b are caused to face the light emitting surface 5b of the VCSEL array 5 and the light incident surface 200a of the lens array 200, respectively. The lens array 6w has collimator lenses 197 in the same arrangement state as the collimator lenses 163 on the light emitting surface 6b of the lens array 6u (FIG. 14). The VCSELs 14 of the VCSEL array 5 and the collimator lenses 197 of the lens array 6w correspond to each other in a one-to-one correspondence, and the total number of the VCSELs 14 of the VCSEL array 5 and the total number of the collimator lenses 197 of the lens array 6w are equal to each other.

The emitting lights from the respective VCSELs 14 of the VCSEL array 5 enter the corresponding collimator lenses 197 of the lens array 6w while spreading gradually in a direction (X-axis direction and Y-axis direction) perpendicular to the traveling direction (Z-axis direction) as the light travels. The respective collimator lenses 197 convert the incident lights from the VCSELs 14 into collimated lights aligned in a direction parallel to the center axis of the lens array 6w, and output the collimated lights from the light outgoing surface 6b.

The lens array 200 includes collimator lenses 203, one for each group, for the incident lights from the lens array 6w. As described with reference to FIG. 13, when four VCSELs 14 constitute one group 154, one collimator lens 203 exists for the four incident lights from the lens array 6w. The diameter of the collimator lens 203 is twice the diameter of the collimator lens 197. In this instance, the total number of the collimator lenses 197 of the lens array 6w and the total number of the collimator lenses 203 of the lens array 200 have a ratio of 4:1.

Each light incident point 7x of the light distribution pattern forming unit 7 is located on the optical axis of each collimator lens 203. Thus, the respective collimator lenses 203 output four incident lights incident thereon through the light outgoing surface 200b so that the four lights enter one light incident point 7x directly opposite to the collimator lens 203.

An advantage of the vehicular headlight 1e is that a lens array in which the orientations of the respective collimator lenses 197, 203 are aligned parallel to the center axes of the lens arrays 6w, 200, i.e., a lens array of simple construction, can be used as the lens arrays 6w, 200.

In the vehicular headlight 1e, since the lens array 6w as the first optical device outputs collimated lights from the respective collimator lenses 197 in parallel with the center axis of the lens array 6w, the lens array 200 as the second optical device can be replaced with a prism device.

FIG. 21 is a structural diagram of a prism device 210 by which the lens array 200 of FIG. 20 is replaced. FIG. 21 is a diagram of the prism device 210 as seen from the side of a light incident surface 210a. The prism device 210 has the light incident surface 210a facing the light outgoing surface 6b of the lens array 6w and a light outgoing surface (not shown) facing the light incident surface 7a of the light distribution pattern forming unit 7, in the direction of the center axis (Z axis in FIG. 20).

Prisms 215 are arranged at an equal pitch in the X-axis direction and the Y-axis direction on the light incident surface 210a of the prism device 210. The prisms 215 are shaped on the basis of a regular quadrangular pyramid, and the vertices 216 are directed toward the lens array 6w. Each corner of the square bottom surface of the prisms 215 is cut off by a cut line 217. The prisms 215 adjacent to each other in the X-axis direction and the Y-axis direction share the cut line 217.

Lights from the respective collimator lenses 197 on the light outgoing surface 6b of the lens array 6w that is directly opposite to the respective light incident points 222 in the Z-axis direction are incident on the light incident points 222 of the four side surfaces 118 of the prisms 215. The lights incident on the respective light incident points 222 of the prisms 215 enter corresponding ones of the light incident points 7x (FIG. 20) on the light incidence surface 7a of the light distribution pattern forming unit 7, which are directly opposed to the light outgoing surface, from the light outgoing surface (not shown) of the prism device 210.

Note that the lens is defined as an optical element in which at least one of the light incident surface and the light outgoing surface is formed of a curved surface, and the prism is defined as an optical element in which both the light incident surface and the light outgoing surface are formed of a flat surface. In the case where a prism device is provided instead of the lens array 200, the prism device does not need to convert non-collimated light into collimated light, and thus the cost of the second optical device can be reduced.

Modified Example

In the VCSEL array 5 of the present embodiment, the VCSELs 14 are formed to have an equal diameter and an equal shape, but the surface emitting lasers of the monolithic array of the present invention do not necessarily have to have an equal diameter and an equal shape.

In the present embodiment, the light distribution pattern forming unit 7 has a flat plate shape, but the light distribution pattern forming unit of the present invention may have a block shape.

In the present embodiment, the longitudinal widths of the high illuminance portions Mb of the light distribution pattern forming unit 7 are equal regardless of the positions in the horizontal direction (transversal direction) on the light incidence surface 7a. In the present invention, the width in the longitudinal direction may be different depending on the position or range in the horizontal direction.

In the present embodiment, in order to generate the three illuminance portions of the low illuminance portion Ma, the high illuminance portion Mb, and the low illuminance portion Ma from the top in the longitudinal direction in the light incidence surface 7a of the light distribution pattern forming unit 7, numerical values 10, 30, and 10 are assigned in order from the top in the longitudinal direction as the number of columns of the VCSELs 14 of the VCSEL array 5. In this case, in the light incidence surface 7a, the dimension ratio in the longitudinal direction of the three illuminance portions is 2:3:2 (=10:15:10) in the case where a pair of outgoing lights Lb is superimposed in the longitudinal direction (FIGS. 4 and 7B), and the ratio is 1:1:1 (=10:10:10) in the case where a set of three outgoing lights Lb is superimposed in the longitudinal direction (FIG. 7C).

However, in the present invention, the dimension ratio in the longitudinal direction of the respective illuminance portions generated on the image forming surface of the light distribution pattern forming unit can be variously set by adjusting the number of surface emitting lasers of the monolithic array light source to be assigned to each illuminance portion.

In this embodiment, during the operation of ADB, the respective VCSELs 14 are continuously turned on or turned off. In the present invention, the duty ratio between the energized period and the non-energized period of the respective VCSELs 14 can be controlled so as to appropriately generate a region part with intermediate illuminance in the irradiation region.

In the present embodiment, Db in FIGS. 4 and 7B and Dc in FIG. 7C are simply described as Db, Dc<Da. When the relationship between Db and Dc is supplemented, Db Dc can be set without being limited to Db<Dc.

In the embodiment, a translucent light scattering unit or a phosphor plate (wavelength conversion unit) is used as the light distribution pattern forming unit 7. The phosphor plate serving as the wavelength conversion unit has phosphor particles therein, and performs wavelength conversion of the passing light. For example, when the emission color of the surface emitting laser is blue, part of the light is converted into yellow light by passing the blue light from the light incident surface side to the light emitting surface side of the phosphor plate, and the light emitted from the phosphor plate becomes white as a mixed color.

In the embodiment, each of the VCSELs 14 of the VCSEL array 5 emits light of the same color. In the present invention, a plurality of types of surface emitting lasers may exist in the surface emitting laser according to the color of the emission light. In the present invention, a plurality of groups are configured such that each group has a plurality of surface emitting lasers in at least a part of the arrangement of the surface emitting lasers, but a plurality of colors of the surface emitting lasers can be used to constitute each group. In this case, each group of the arrangement of surface emitting lasers includes all types of surface-emitting lasers one by one. This makes it possible to equalize the color of change at each light incident point on the light incident surface of the light distribution pattern forming unit.

In the description of FIG. 17 of the embodiment, the predetermined number as the number of stages of the illuminance stage W of the section 74 is 5. If the number of VCSELs 14 constituting the group 154 is appropriately changed to a value other than 4, the predetermined number as the number of stages of the illuminance stage W of the section 74 can be changed to 3 or 5 or more. The reason why 2 is excluded from the predetermined number is that the group 154 must be composed of at least two or more VCSELs 14. In other words, the number of illuminance stages W becomes three or more due to this matter.

In FIG. 18 corresponding to the embodiment, the description has been given that the light source controlling unit 131 moves the section of the brightest illuminance stage on the light incident surface 7a of the light distribution pattern forming unit 7 leftward or rightward with respect to the center of the light incident surface 7a in accordance with the turning direction of the vehicle on which the vehicular headlight 1c is mounted. In the light source controlling unit of the present invention, the section of the brightest illuminance stage on the light incident surface 7a of the light distribution pattern forming unit 7 can be moved not only leftward or rightward with respect to the center of the light incident surface 7a, but also vertically and obliquely in any directions.

In FIG. 19 corresponding to the embodiment, only the oncoming vehicle 186 is described as a target. In the present invention, the target may include a person or a preceding vehicle in front of the vehicle other than the oncoming vehicle 186.

REFERENCE SIGNS LIST 1a to 1e . . . vehicular headlight
5 . . . VCSEL array (monolithic array light source)
6, 6u, 6v, 6w, 46 . . . lens array (image forming unit)
6a, 8a, 46a . . . light incident surface
5b, 6b, 7b, 8b, 46b . . . light emission surface or light outgoing surface
7 . . . light distribution pattern forming unit
7a . . . incident surface (image forming surface)
8 . . . projection unit
14 . . . VCSEL (surface emitting laser)
18a, 18b, 18c . . . collimator lens
19a . . . first group
19b . . . second group
48 . . . prism member
56 . . . light distribution pattern controlling device (light source controlling unit)
57 . . . switching device (light source controlling unit)
68 . . . oncoming vehicle (forward vehicle)
The invention claimed is:
1. A vehicular headlight comprising:
a monolithic array light source in which a plurality of surface emitting lasers are arranged;
an image generation unit configured to include a lens array in which a plurality of collimator lenses are arranged for outputting incident lights from the respective surface emitting lasers of the monolithic array light source as collimated lights, and to output incident lights from the respective surface emitting lasers of the monolithic array light source by adjusting directions of lights after passing so that an image of a light distribution pattern as an illuminance distribution is generated on an output side;
a light distribution pattern forming unit configured to include an image forming surface on which the image of the light distribution pattern is formed by the incident lights from the image generation unit, and to emit the incident lights from the image generation unit through the image forming surface;
a projection unit configured to output the incident lights from the light distribution pattern forming unit to an irradiation region in front of the vehicle; and
a light source controlling unit configured to control luminance of the monolithic array light source.
2. The vehicular headlight according to claim 1, wherein the lens array includes:
a first group of collimator lenses configured to change the directions of the incident lights and output the lights so that light incident points of the incident lights from the plurality of surface emitting lasers of the monolithic array light source do not overlap with each other on the image forming surface of the light distribution pattern forming unit, and
a second group of collimator lenses configured to change the directions of the incident lights and output the lights so that light incident points of the incident lights from the plurality of surface emitting lasers of the monolithic array light source overlap with each other on the image forming surface of the light distribution pattern forming unit.
3. The vehicular headlight according to claim 1, wherein the image generating unit includes a prism member configured to adjust the direction of the incident light from each collimator lens of the lens array after passing and output the light so that an image of the light distribution pattern as an illuminance distribution is generated on the output side.
4. The vehicular headlight according to claim 3, wherein the prism member includes:
a first group of prisms configured to change the directions of the incident lights and output the lights so that light incident points of the incident lights from the plurality of collimator lenses of the lens array do not overlap with each other on the image forming surface of the light distribution pattern forming unit, and
a second group of prisms configured to change the directions of the incident lights and output the lights so that light incident points of the incident lights from the plurality of collimator lenses of the lens array overlap with each other on the image forming surface of the light distribution pattern forming unit.
5. The vehicular headlight according to claim 1, wherein the light source controlling unit includes:
a switching device configured to individually switch turned-on and turned-off of the plurality of surface emitting lasers of the monolithic array light source for each pair or each set, and
a light distribution pattern controlling device configured to control the switching device such that when presence of a vehicle is detected in the irradiation region of the vehicular headlight, the surface emitting laser for generating outgoing light directed to the vehicle is turned off.

6. The vehicular headlight according to claim 1, wherein
the monolithic array light source is configured to have a plurality of groups such that each of the groups has a plurality of the surface emitting lasers in at least a part of the array of surface emitting lasers,
the light distribution pattern forming unit has a light incident surface on which the plurality of light incident points are distributed in a constant density and a light distribution pattern is generated as a distribution of illuminance by the incident light to each of the light incident points, and a light outgoing surface through which lights having passed through the light incident surface are outputted, and
the image generating unit changes the direction of each emission light so that the emission lights of the surface emitting lasers belonging to the same group in the monolithic array light source are incident on a corresponding common light incident point on the light incident surface of the light distribution pattern forming unit.

7. The vehicular headlight according to claim 6, wherein
the collimator lenses of the lens array and the surface emitting lasers of the monolithic array light source are associated with each other in a one-to-one correspondence, and
each of the collimator lenses directs the incident light from each of the surface emitting lasers to a corresponding one of the light incident points of the light distribution pattern forming unit.

8. The vehicular headlight according to claim 6, wherein
the image generating unit includes a first optical unit as the lens array and a second optical unit different from the first optical unit,
in the first optical unit, the collimator lenses are associated with the surface emitting lasers of the monolithic array light source in a one-to-one correspondence to output the incident lights from the respective surface emitting lasers as collimated lights in the same direction, and
in the second optical unit, the incident lights from the respective collimator lenses of the first optical unit are directed to the corresponding light incident points of the light distribution pattern forming unit.

9. The vehicular headlight according to claim 6, wherein
the light source controlling unit controls the illuminance distribution on the light incident surface by controlling the number of the turned-on surface emitting lasers of each group of the monolithic array light source.

10. The vehicular headlight according to claim 6, wherein
the light incident surface of the light distribution pattern forming unit is sectioned into a plurality of sections each including a single light incident point inside, and
the light source controlling unit controls an illuminance stage of the section of the light distribution pattern forming unit by changing the number of the turned-on surface emitting lasers of the group of the monolithic array light source corresponding to the section.

11. The vehicular headlight according to claim 10, wherein
the light source controlling unit controls the number of the turned-on surface emitting lasers for each group of the monolithic array light source so that a region including a plurality of sections of a brightest illuminance stage on the light incident surface of the light distribution pattern forming unit moves in an optional direction with respect to the center of the light incident surface.

12. The vehicular headlight according to claim 10 wherein
the light source controlling unit controls the number of the turned-on surface-emitting lasers for each group of the monolithic array light sources so that the illuminance stage of the plurality of sections occupying a central portion on the light incident surface of the light distribution pattern forming unit becomes a brighter illuminance stage than the illuminance stage of the plurality of sections occupying a peripheral portion thereof.

13. The vehicular headlight according to claim 10, wherein
the illuminance stage of the section includes an illuminance stage in which the illuminance of the light incident point included in the section becomes 0 (zero).

14. The vehicular headlight according to claim 6, wherein
the light distribution pattern forming unit is a light scattering unit having translucency.

15. The vehicular headlight according to claim 6, wherein
the light distribution pattern forming unit is a wavelength conversion unit configured to perform wavelength conversion of the passing light by a phosphor.

* * * * *